(12) United States Patent
Sato et al.

(10) Patent No.: US 9,182,581 B2
(45) Date of Patent: Nov. 10, 2015

(54) MICROSCOPE APPARATUS, OPTICAL PICKUP APPARATUS AND LIGHT IRRADIATION APPARATUS

(75) Inventors: Shunichi Sato, Sendai (JP); Yuichi Kozawa, Sendai (JP); Hiroyuki Yokoyama, Sendai (JP); Tomomi Nemoto, Sapporo (JP); Terumasa Hibi, Sapporo (JP); Nobuyuki Hashimoto, Iruma (JP); Makoto Kurihara, Kawagoe (JP)

(73) Assignees: JAPAN SCIENCE AND TECHNOLOGY AGENCY, Saitama (JP); CITZEN HOLDINGS CO., LTD., Tokyo (JP)

( * ) Notice: Subject to any disclaimer, the term of this patent is extended or adjusted under 35 U.S.C. 154(b) by 675 days.

(21) Appl. No.: 13/581,248

(22) PCT Filed: Feb. 24, 2011

(86) PCT No.: PCT/JP2011/054819
§ 371 (c)(1),
(2), (4) Date: Aug. 24, 2012

(87) PCT Pub. No.: WO2011/105618
PCT Pub. Date: Sep. 1, 2011

(65) Prior Publication Data
US 2012/0314147 A1    Dec. 13, 2012

(30) Foreign Application Priority Data

Feb. 26, 2010   (JP) ................................ 2010-042763

(51) Int. Cl.
*G02F 1/13* (2006.01)
*G02F 1/1337* (2006.01)
(Continued)

(52) U.S. Cl.
CPC .......... *G02B 21/0092* (2013.01); *G02F 1/0136* (2013.01); *G02F 1/1347* (2013.01);
(Continued)

(58) Field of Classification Search
CPC .................................................... G02F 1/13362
USPC .................................................. 349/193, 194
See application file for complete search history.

(56) References Cited

U.S. PATENT DOCUMENTS

| | | | |
|---|---|---|---|
| 7,518,674 B2 * | 4/2009 | Moriya | 349/75 |
| 2009/0244411 A1 * | 10/2009 | Takane et al. | 349/1 |
| 2010/0141939 A1 | 6/2010 | Zhan | |

FOREIGN PATENT DOCUMENTS

| | | |
|---|---|---|
| JP | 2001-159751 A | 6/2001 |
| JP | 2006-313273 A | 11/2006 |

(Continued)

OTHER PUBLICATIONS

Sun et al, "Ultrasmall focusing spot with a long depth of focus based on polarization and phase modulation", Optics Letters, Jan.15 2003 p. 99-101, vol. 28 No. 2, Opt Soc of Amer.
Wang et al., "Creation of a needle of longitudinally polarized light in vacuum using binary optics",Nature Photonics, Jun. 28 2008, p. 501-505, vol. 2,Macmillan Publishers,online.

(Continued)

*Primary Examiner* — Wen-Ying P Chen

(57) ABSTRACT

The microscope apparatus includes a light source which outputs linear polarization having a first wavelength, a polarization conversion element which includes a liquid crystal layer, and by causing linear polarization to pass the liquid crystal layer, converts linear polarization to radial polarization, an objective lens which focuses the radial polarization onto an object surface, a condenser lens which collimates the light reflected from the object surface, a light receiving element which receives light collimated by the condenser lens and outputs signal in accordance with the intensity of light, and a controller which applies electric voltage in accordance with the first wavelength to the liquid crystal layer of the polarization conversion element. The polarization conversion element is disposed in the pupil plane of the objective lens on the light source side.

10 Claims, 11 Drawing Sheets

(51) Int. Cl.
  *G02F 1/1343* (2006.01)
  *G02B 21/00* (2006.01)
  *G02F 1/01* (2006.01)
  *G02F 1/1347* (2006.01)

(52) U.S. Cl.
  CPC ...... *G02F1/134309* (2013.01); *G02F 2203/04* (2013.01); *G02F 2203/07* (2013.01); *G02F 2203/50* (2013.01)

(56) References Cited

FOREIGN PATENT DOCUMENTS

| | | | |
|---|---|---|---|
| JP | 2007-193025 | A | 8/2007 |
| JP | 2008-039882 | A | 2/2008 |
| JP | 2009-116311 | A | 5/2009 |
| JP | 2009-541742 | A | 11/2009 |
| JP | 2010-019630 | A | 1/2010 |
| WO | 2008/071823 | A2 | 6/2008 |

OTHER PUBLICATIONS

Yoshiki et al., "High Resolution Imaging of Cell Organelle Using Compact Polarization Mode Converter", JBMES, Dec. 2008, p. 698-702, Osaka, Japan, Section 3: Partial Translation.

Nishiyama et al. "One shot birefringence measurement using a liquid crystal radial polrizer" JSAP and Related Societies, Mar. 22, 2006, vol. 53 No. 3, P1067, Corr. to Cite No. 14.

Hashimoto et al., "Beam Danmennai Henko Bunpu Seigyo to Kenbi Kansoku eno Oyo", Optical Alliance, Apr. 1, 2009, vol. 20, No. 4, pp. 21-25 ISSN0917-26X Corr. to Cite No. 14.

International Search Report for PCT/JP2011/054819, Apr. 12, 2011.

International Search Report for PCT/JP2011/054820 which relates to the present application, Apr. 12, 2011.

European Patent Office, Supplementary European Search Report for EP Patent Application No. 11747570.7, May 27, 2015.

Ren Hongwen. et al. "Linear to axial or radial polarization conversion using a liquid crystal gel", Applied Physics Letters, Aug. 3, 2006, pp. 051114-051114, vol. 89, No. 5, American Institute of Physics, US.

* cited by examiner

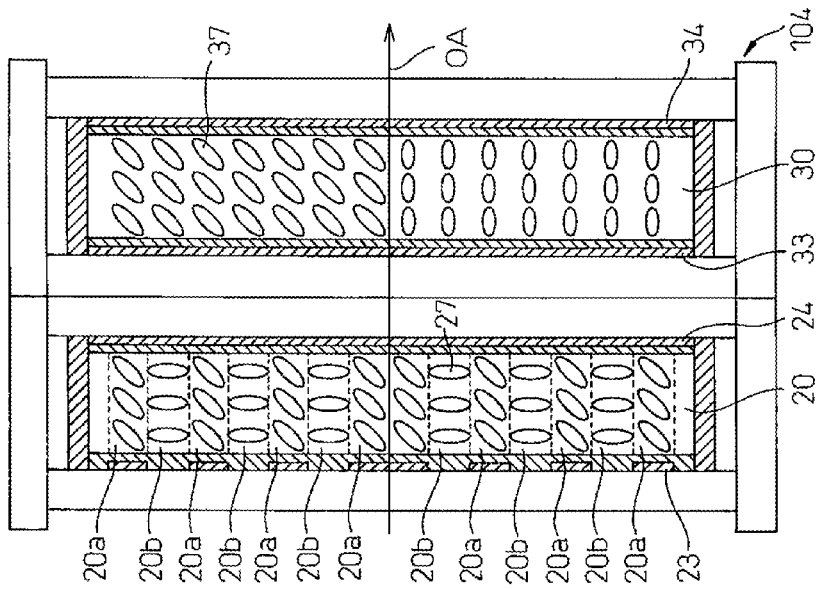
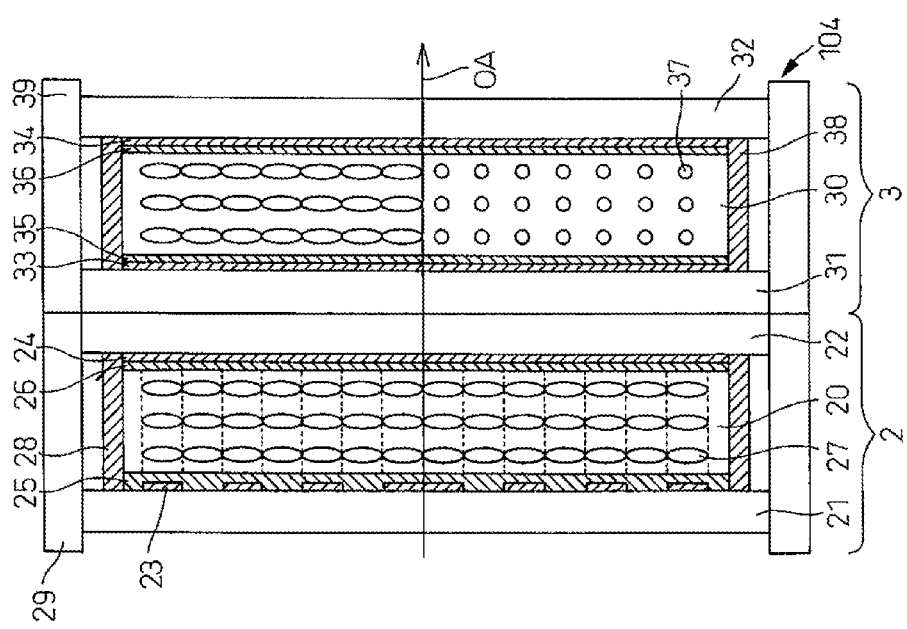

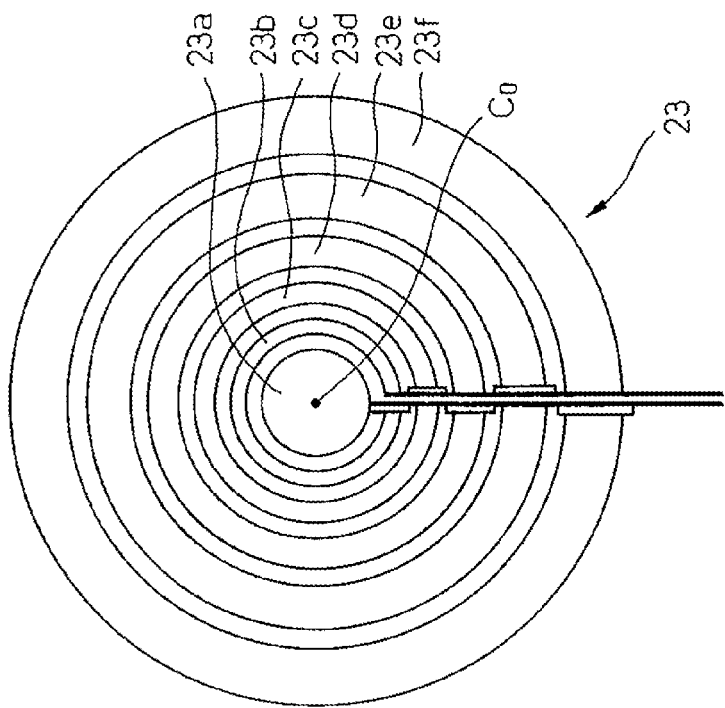
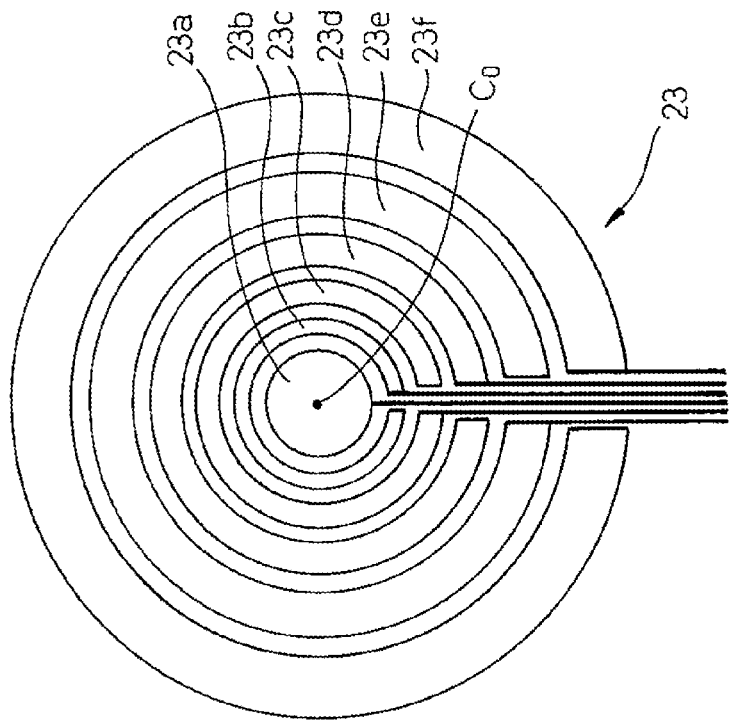

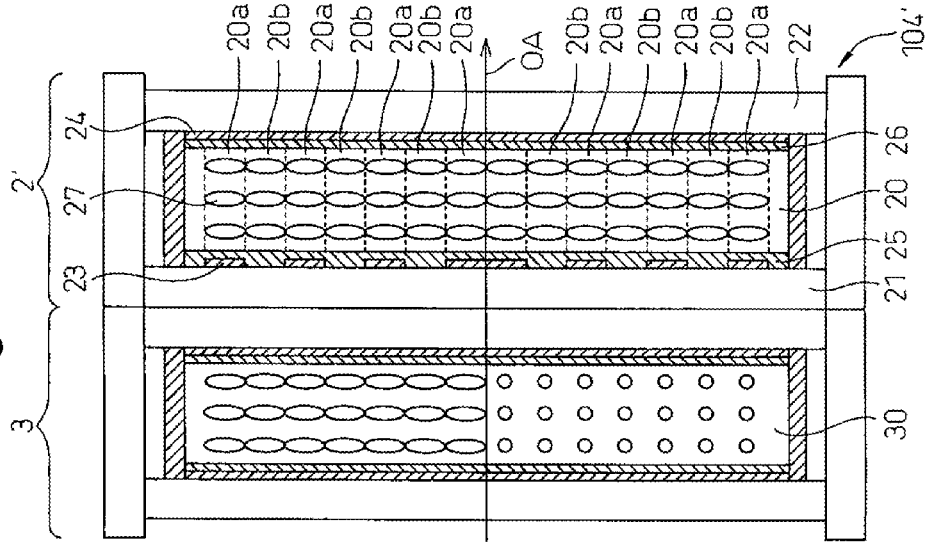
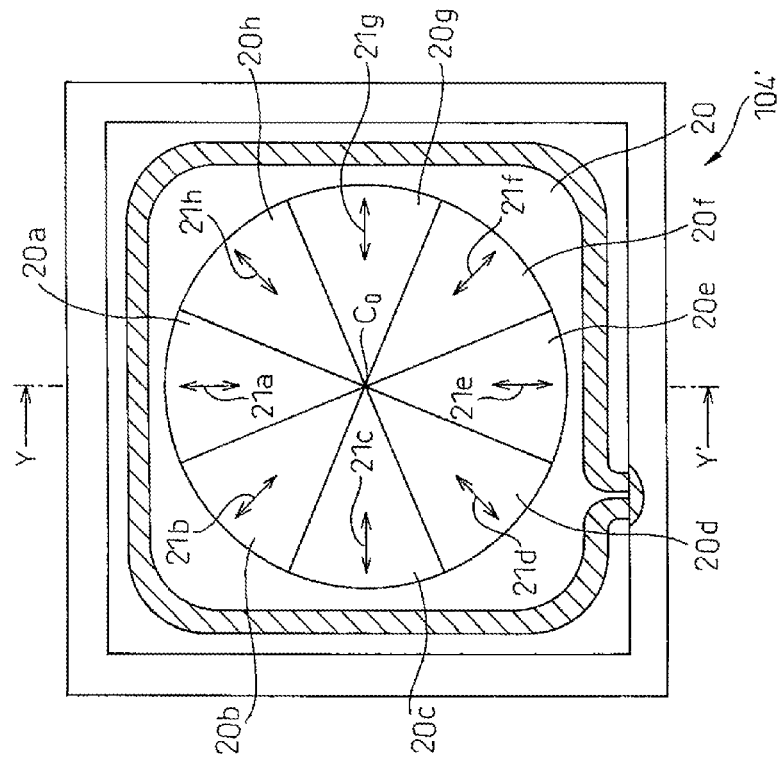

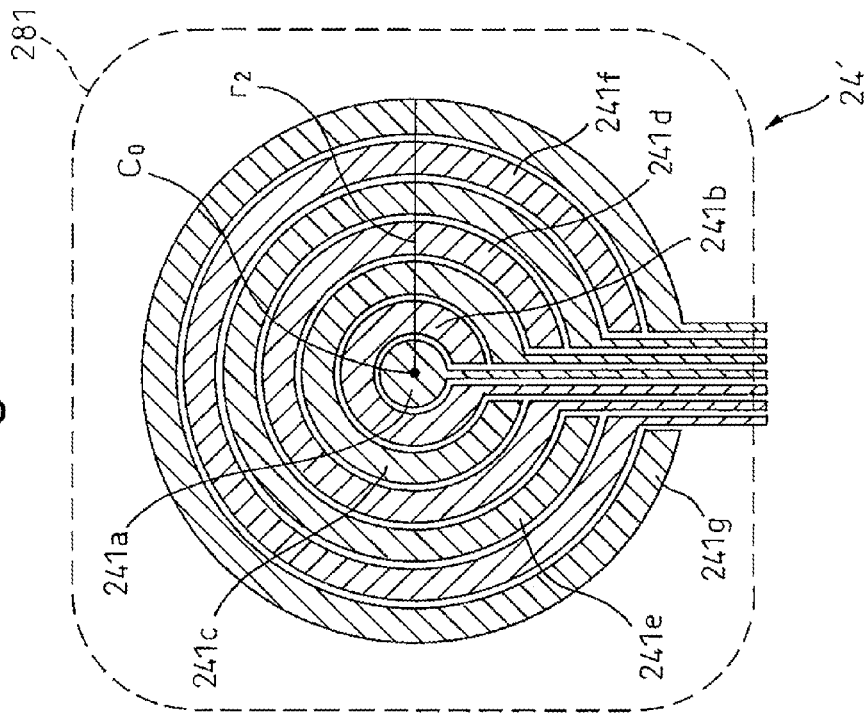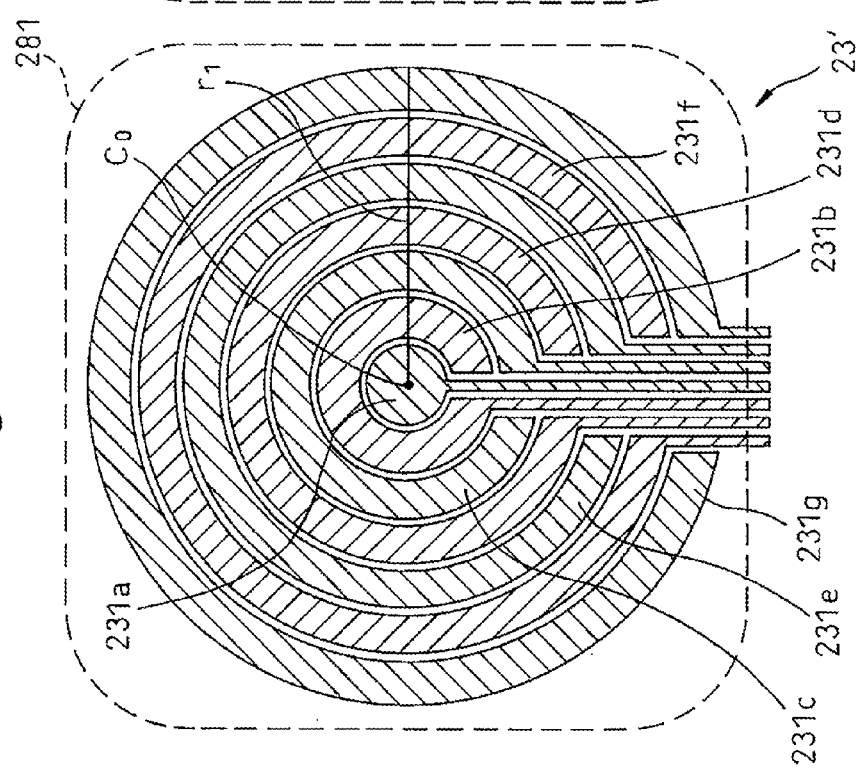

MICROSCOPE APPARATUS, OPTICAL PICKUP APPARATUS AND LIGHT IRRADIATION APPARATUS

FIELD OF THE INVENTION

The present invention relates to a microscope apparatus, an optical pickup apparatus and a light irradiation apparatus using a polarization conversion element for converting linear polarization to radial polarization.

BACKGROUND ART

A microscope apparatus in which a laser is used as an irradiation light source and a laser beam outputted from an irradiation light source is irradiated onto a sample in order to observe the sample has been conventionally used. In such a microscope, in order to increase resolution, it is desirable that the diameter of beam spot radiated from the irradiation light source and focused onto a sample be as small as possible. In general, a minimum diameter of a beam spot is defined by diffraction limit, and the minimum diameter is thus proportional to wavelength of light. Therefore, the shorter the wavelength of light radiated from a light source, the smaller the diameter of a beam spot.

However, a light source that emits short wavelength light, i.e., a laser emitting violet light or ultra violet light is generally more expensive than a light source that emits light of longer wavelength, for example green light or red light. Also, in general, in the wavelength range from violet to ultra violet, light transmittance of optical material decreases as wavelength becomes shorter. Therefore, an optical material that exhibits high light transmittance for violet or ultra violet light is very limited.

Thus, radial polarization is now attracting much attention. Radial polarization is a polarized light beam in which polarization plane of linearly polarized light is distributed radially with the optical axis as a center. It is reported that, by focusing a light beam of radial polarization with a condenser to a focus, the focused light beam in the focus plane has Z-polarization (i.e., the direction of electric field is same as the direction of propagation of light), so that light beam can be focused in smaller spot diameter than the spot diameter defined by diffraction limit of X- or Y-polarization). It is also reported that as the range of a small beam diameter along the optical axis becomes longer, and larger depth of focus can be achieved. (See, for example, Chin-Cherng Sun, Chin-Ku Liu, "Ultrasmall focusing spot with a long depth of focus based on polarization and phase modulation", OPTICS LETTERS, Optical Society of America, 2003, vol. 28, No. 2, p. 99-101; and HAIFENG WANG, et. al., "Creation of a needle of longitudinally polarized light in vacuum using binary optics", Nature photonics, 2008, vol. 2, p. 501-505).

SUMMARY OF THE INVENTION

In order to generate such radial polarization, a polarization conversion element is used in which a plurality of half wave plates are arranged in a plane perpendicular to the optical axis so as to have different directions of optic axis. Also, a polarization conversion element is proposed in which photonic crystal is used to convert linear polarization to radial polarization.

However, in a half wave plate or a photonic crystal, as wavelength of incident light varies, phase difference between ordinary ray and extraordinary ray varies. Therefore, in a polarization conversion element using half wave plates or photonic crystal, when wavelength of light incident on the polarization conversion element differs from the design wavelength of the element, it is no longer possible to convert the incident light to radial polarization.

Thus, it is an object of the present invention to provide a microscope apparatus, an optical pickup apparatus and a light irradiation apparatus that has higher resolution than the resolution defined by diffraction limit by using illuminating light of any wavelength within a prescribed wavelength range.

Means for Solving the Problem

In accordance with an aspect of the present invention, a microscope apparatus is provided. The microscope apparatus includes a light source which outputs linear polarization having a first wavelength, a polarization conversion element which includes a liquid crystal layer containing liquid crystal molecules, and which, by causing the linear polarization to pass the liquid crystal layer, converts the linear polarization to radial polarization, an objective lens which focuses the radial polarization onto a surface of an object, a collimating lens which collimates light from the object surface, a light receiving element which receives light from collimating lens and outputs signal corresponding to light intensity of received light, and a controller which applies an electric voltage in accordance with the first wavelength to the liquid crystal layer of the polarization conversion element.

The polarization conversion element is disposed on the light source side of the objective lens, and includes a phase reversal element which reverses the phase of a portion of incident light, and a polarization plane rotation element which converts linear polarization to radial polarization. The polarization conversion element includes the liquid crystal layer and two transparent electrodes disposed in opposition to each other so as to sandwich the liquid crystal layer inbetween, wherein the liquid crystal layer includes a plurality of regions disposed along circumferential direction with a first intersection point of the polarization plane rotation element and the optical axis as a center, and alignment direction of the liquid crystal molecules contained each of the plurality of regions is different from each other, and by applying an electric voltage depending on the first wavelength between the two first transparent electrodes, each of the plurality of regions of the liquid crystal layer rotates the polarization plane of the component of the linear polarization passing the region in accordance with the alignment direction of the liquid crystal molecules contained in the region so as to bring the polarization plane parallel to the radial direction with the first intersection point as the center. In this way, the polarization plane rotation element converts linear polarization to radial polarization.

The phase reversal element has first annular portions and second annular portions disposed alternately along radial direction with a second intersection point of the phase reversal element with the optical axis as the center, and reverses the phase of linear polarization or radial polarization incident on the first annular portions relative to the phase of linear polarization or radial polarization incident on the second annular portions.

Preferably, the alignment direction of liquid crystal molecules included in each of the plurality of regions is such that the angle between the alignment direction and the polarization plane of linear polarization incident on the polarization plane rotation element is ½ of the angle of a prescribed line passing through the first intersection point and the region relative to the polarization plane, and when an electric voltage in accordance with the first wavelength is applied between the two transparent electrodes, the polarization plane rotation element rotate the polarization plane of the component of the incident linear polarization transmitted by each of the plurality of regions by twice the angle between the polarization plane and the alignment direction so as to make the polarization plane of the component parallel to the prescribed line described above.

The prescribed line in each of the plurality of regions is preferably a line passing through the first intersection point and bisecting the region.

Further, it is preferable to set the alignment direction in the plurality of regions such that, when, among the plurality of regions, one of two regions intersecting a plane which is parallel to the polarization plane of the linear polarization incident on the polarization plane rotation element and passes the optical axis, is referred to as a first region and total number of regions is N, the angle θ between the alignment direction in the n-th region in the order of clockwise or anti-clockwise rotation starting from the first region and the polarization plane of linear polarization incident on the first region is $$\theta = 360° \times (n-1)/(2N)$$

where n is an integer from 1 to N.

Preferably, the phase reversal element includes also a second liquid crystal layer containing liquid crystal molecules, and two second transparent electrodes disposed in opposition to each other so as to sandwich the second crystal layer, wherein one of the two second transparent electrodes is a plurality of annular electrodes corresponding to the first annular portions, and by applying electric voltage in accordance with the first wavelength between the annular electrodes and the other of the two second transparent electrode, the phase reversal element reverses the phase of the linear polarization or radial polarization incident on the first annular portion.

In this case, preferably, the phase reversal element is disposed on the incident side of the polarization plane rotation element, and the liquid crystal molecules contained in the second liquid crystal layer are aligned along the direction parallel to the polarization plane of the linear polarization incident on the phase reversal element.

Alternatively, the phase reversal element is disposed on the exit side of the polarization plane rotation element, and preferably, the liquid crystal molecules contained in the second liquid crystal layer are aligned along the radial direction with the second intersection point as the center.

The microscope apparatus preferably includes a second light source which outputs linear polarization having a second wavelength different from the first wavelength, and which is disposed such that the linear polarization having the second wavelength passes the polarization conversion element and the objective lens and is focused on the object surface. In this case, the controller preferably turns on one of the first light source and the second light source, and applies an electric voltage in accordance with the wavelength of the linear polarization outputted from the light source being turned on between two first transparent electrodes and between two second transparent electrodes.

In accordance with another aspect of the present invention, an optical pickup apparatus is provided. The optical pickup apparatus includes a light source which outputs linear polarization having a prescribed wavelength, a polarization conversion element which includes a liquid crystal layer containing liquid crystal molecules and which converts linear polarization passing the liquid crystal layer to radial polarization, an objective lens focusing radial polarization onto an object surface, an imaging lens which forms an image from light reflected from the object surface, a light receiving element which receives imaged light from the imaging lens and outputs signal corresponding the intensity of received light, a driving circuit which applies electric voltage in accordance with the prescribed wavelength to the liquid crystal layer of the polarization conversion element, and a controller which adjusts the electric voltage outputted by the driving circuit so as to maximize the signal corresponding to the intensity of received light.

The polarization conversion element is disposed in the pupil plane of the objective lens on the light source side, and includes a phase reversal element which reverses the phase of a part of incident light, and a polarization plane rotation element which converts linear polarization to radial polarization, arranged along the optical axis. The polarization plane rotation element includes a liquid crystal layer described above, and two first transparent electrodes disposed in opposition to each other so as to sandwich the liquid crystal layer, wherein the liquid crystal layer has a plurality of regions disposed along a circumferential direction with a first intersection point of the polarization plane rotation element and the optical axis, and alignment direction of liquid crystal molecules contained in each of the plurality of regions is different from each other. When an electric voltage depending on the prescribed wavelength is applied between the two first transparent electrodes, each of the plurality of regions of the liquid crystal layer rotates the polarization plane of the component of the linear polarization passing the region in accordance with the alignment direction of the liquid crystal molecules contained in the region so as to bring the polarization parallel to the radial direction with the first intersection point as the center. In this way, the polarization plane rotation element converts linear polarization to radial polarization.

The phase reversal element has first annular portions and second annular portions disposed alternately along radial direction with a second intersection point of the phase reversal element and the optical axis as the center, and reverses the phase of linear polarization or radial polarization incident on the first annular portions relative to the phase of linear polarization or radial polarization incident on the second annular portions.

In accordance with still another aspect, a light irradiation apparatus is provided. The light irradiation apparatus includes a light source which outputs linear polarization having a prescribed wavelength, a polarization conversion element which includes a liquid crystal layer containing liquid crystal molecules and converts linear polarization passing the liquid crystal layer to radial polarization, an objective lens which focuses radial polarization onto an object surface, and a driving circuit which applies electric voltage in accordance with the prescribed wavelength of linear polarization outputted from the light source to the liquid crystal layer.

The polarization conversion element is disposed in the pupil plane of the objective lens on the light source side, and includes a phase reversal element that reverses the phase of a part of incident light, and a polarization plane rotation element which converts linear polarization to radial polarization, arranged along the optical axis. The polarization plane rotation element includes the liquid crystal layer, and two first transparent electrodes disposed in opposition to each other so as to sandwich the liquid crystal layer, wherein the liquid crystal layer has a plurality of regions disposed along circumferential direction with a first intersection point of the polarization plane rotation element and the optical axis, and alignment direction of liquid crystal molecules contained in each of the plurality of regions is different from each other. When an electric voltage depending on the prescribed wavelength is applied between the two first transparent electrodes, each of the plurality of regions of the liquid crystal layer rotates the polarization plane of the component of the linear polarization passing the region in accordance with the alignment direction of the liquid crystal molecules contained in the region so as to bring the polarization plane parallel to the radial direction with the first intersection point as the center. In this way, the polarization plane rotation element converts linear polarization to radial polarization.

The phase reversal element has first annular portions and second annular portions disposed alternately along radial direction with a second intersection point of the phase reversal element and the optical axis as the center, and reverses the phase of linear polarization or radial polarization incident on the first annular portions relative to the phase of linear polarization or radial polarization incident on the second annular portions.

Effect of the Invention

The microscope apparatus, optical pickup apparatus and light irradiation apparatus according to the present invention provide an advantageous effect that, by adjusting electric voltage applied to the liquid crystal of the polarization conversion element, the microscope apparatus, optical pickup apparatus and light irradiation apparatus can achieve resolution higher than the resolution defined by diffraction limit as long as the wavelength of illumination light used is included in a prescribed wavelength range.

BRIEF DESCRIPTION OF THE DRAWINGS

FIG. 3A is a schematic side sectional view of the polarization conversion element taken along the line indicated by the arrow XX' of FIG. 2, when no electric voltage is applied, and FIG. 3B is a schematic side sectional view of the polarization conversion element taken along the line indicated by the arrow XX' of FIG. 2, when an electric voltage is applied.

FIGS. 9A and 9B are schematic front views respectively illustrating transparent electrodes provided on the incident side of the phase reversal element of the variant.

FIG. 10A is a schematic rear view of the polarization conversion element according to the second embodiment, and FIG. 10B is a schematic side sectional view of the polarization conversion element according to the second embodiment, taken along the line indicated by the arrow YY' of FIG. 10A.

FIG. 11A is a schematic front view illustrating the structure of one of the transparent electrodes of the phase reversal element according to a variant of the present invention, and FIG. 11B is a schematic rear view illustrating the structure of the other of the transparent electrodes of the phase reversal element according to the variant of the present invention.

DESCRIPTION OF EMBODIMENTS

A microscope apparatus according to an embodiment will be described with reference to drawings. This microscope apparatus includes a polarization conversion element that is disposed in the entrance pupil plane of the objective lens and converts linear polarization of the illumination light to radial polarization. With this element, the microscope can focus the light from illuminating light source in a spot diameter smaller than the spot diameter defined by diffraction limit by producing z-polarization effect in the focal plane of the objective lens. The polarization conversion element includes the liquid crystal layer for controlling polarization plane of the illuminating light, and by adjusting the electric voltage applied to the liquid crystal layer, the microscope apparatus can, when using illuminating light of any wavelength included in a prescribed wavelength range, convert the illuminating light to radial polarization.

Figure 1:
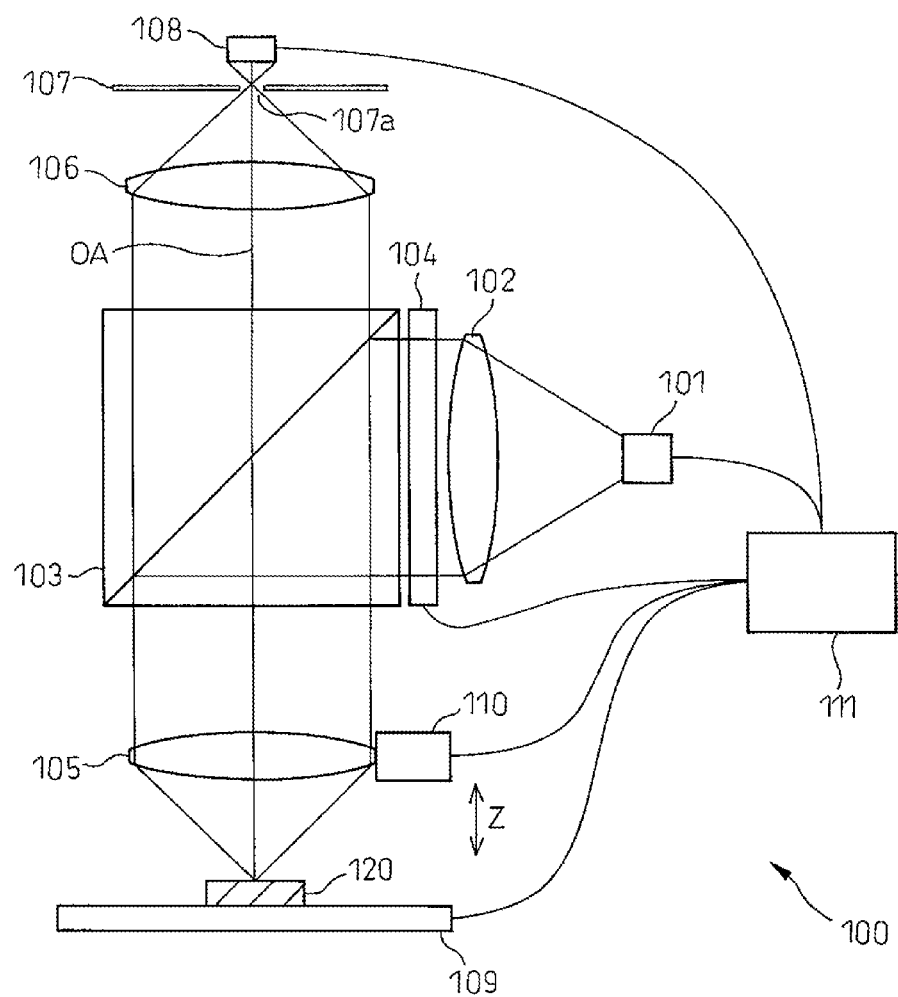
FIG. 1 is a schematic view illustrating the construction of a microscope apparatus according to an embodiment of the present invention.

FIG. 1 is a schematic view illustrating the construction of a microscope apparatus according to an embodiment of the present invention. The microscope apparatus 100 includes a light source 101, a collimating lens 102, a beam splitter 103, a polarization conversion element 104, an objective lens 105, a condenser lens 106, a masking plate 107, a light receiving element 108, a movable stage 109, an actuator 110 and a controller 111.

The light receiving element 108, the masking plate 107, the condenser lens 106, the beam splitter 103 and the objective lens 105 are arranged in a row along the optical axis OA defined by the condenser lens 106 and the objective lens 105. On one side of the beam splitter 103, the light source 101 and the collimating lens 102 and the polarization conversion element 104 are arranged in a row along a direction orthogonal to the optical axis OA.

Illuminating light that is linear polarization emitted from the light source 101 passes the collimating lens 102 and then is transmitted by the polarization conversion element 104. The illuminating light is converted in passing the polarization conversion element 104 to radial polarization. Thereafter, the illuminating light that is radial polarization is reflected by the beam splitter 103, and is focused by the objective lens 105 to the object surface to be observed, which is set to the surface or interior of the sample 120 disposed on the movable stage 109. Light that is reflected or scattered from the object surface, or fluorescence emission, again pass the objective lens 105 and then pass the beam splitter 103 straight on. Then, the light reflected or scattered from the object surface, or fluorescence emission, is focused by the condenser lens 106 onto the light receiving element 108. The collimating lens 102, the objective lens 105, and the condenser lens 106 compose a confocal optical system, and when light from the light source 101 is focused on the object surface, the light from the focal point is focused onto the light receiving element 106.

Although not illustrated the microscope apparatus 100 may include various compensation optical system such as spherical aberration compensation optical system on the optical path.

The light source 101 outputs linear polarization as illuminating light. Therefore, the light source 101 has, for example, a semiconductor laser. Alternatively, the light source 101 may have a gas laser such as argon ion laser, or a solid laser such as YAG laser. When light from the light source 101 is not linear polarization, an analyzer may be disposed between the light source 101 and the collimating lens 102 in order to convert the illuminating light to linear polarization.

Further, the light source 101 may have plural light emitting elements for outputting light of mutually different wavelengths included in the prescribed wavelength range, for example, in the range of 351 nm to 750 nm. In this case, the light source outputs illuminating light from one light emitting element in accordance with the control signal from the controller 111.

The collimating lens 102 is disposed between the light source 101 and the beam splitter 103 such that the light source 101 is positioned at the front focus of the collimating lens 102. The collimating lens 102 converts the illuminating light from the light source 101 to parallel beam, and the illuminating light as a parallel beam enters the polarization conversion element 104.

The polarization conversion element 104 is preferably disposed at the front pupil plane of the objective lens 105. In particular, in the present embodiment, the polarization conversion element 104 is disposed between the light source 101 and the beam splitter 103 such that the light from the object surface does not pass the polarization conversion element 104. The polarization conversion element 104 includes liquid crystal layer, and by changing the polarization direction of light passing the liquid crystal layer, the polarization conversion element 104 converts linear polarization of the illuminating light to radial polarization. The polarization conversion element 104 may be disposed between the beam splitter 103 and the objective lens 105 in order for the light from the object surface to pass the polarization conversion element 104.

The beam splitter 103 is disposed between the objective lens 105 and the condenser lens 106. The beam splitter 103 reflects the illuminating light incident from the collimating lens 102 toward the objective lens 105. On the other hand, the beam splitter 103 pass the incident light straight along the optical axis OA.

The objective lens 105 focuses the radial polarization exiting from the polarization conversion element 104 and reflected from the beam splitter 103 onto the object surface. In this case, near the focus, the light condensed by the objective lens 105 is z-polarization, so that the spot diameter of light beam near the focus can be made smaller than the spot diameter defined by diffraction limit. For example, the spot diameter in the present embodiment is about 1/1.5 to about 1/1.7 of the spot diameter defined by diffraction limit. Also, depth of focus of the condensed light can be made larger.

Further, the objective lens 105 is provided with an actuator 110 for adjusting the focal position. By moving the objective lens 105 with the actuator 110 in the direction of the arrow Z in the Figure, that is along the direction parallel to the optical axis OA, the focal position of the illuminating light is moved in the direction of the optical axis OA. The actuator 110 is connected to the controller 111, and moves the objective lens 105 in accordance with the control signal from the controller 111.

Light reflected or scattered from the object surface passes the objective lens 105 again to become parallel beam. The light beam passes the beam splitter 103 and enters the condenser lens 106. Light that entered the condenser lens 106 is received by the light receiving element 108.

The masking plate 107 is disposed between the condenser lens 106 and the light receiving element 108 near the focal point of the condenser lens 106. A pinhole 107a is formed in the masking plate 107 along the optical axis OA. With this, light reflected or scattered from the near-focus of the objective lens 105, or fluorescent light emission, enters the condenser lens 106 as parallel light beam, and is focused near the pinhole 107a and can pass the pinhole 107a and reach the light receiving element 108. On the other hand, light from position outside the focal point of the objective lens 105 is stopped by the masking plate 107 and cannot reach the light receiving element 108. Thus, the microscope apparatus 100 can obtain an image of the sample 120 with high contrast.

The light receiving element 108 has a semiconductor photo detector, for example, an array of a plurality of CCD or C-MOS. Each semiconductor photo detector outputs electrical signal corresponding to the intensity of received light. The light receiving element 108 averages the electrical signal outputted by each semiconductor photo detector, and transmits an electrical signal corresponding to the averaged value as a light intensity signal representing the intensity of received light to the controller 111. Alternatively, the light receiving element 108 may include a photo multiplier tube. Then, the light receiving element 108 generates electrical signal corresponding to the intensity of light received by the photo multiplier tube, and transmits the electrical signal as a light intensity signal representing the intensity of received light to the controller 111.

The movable stage 109 is a stage to place the sample 120. The movable stage 109 may be, for example, a so-called XY-stage, and is movable in two directions orthogonal to each other in a plane perpendicular to the optical axis OA. For convenience, one of the movable directions of the movable stage is hereinafter referred to as X-axis, and the other direction orthogonal to X-axis is referred to as Y-axis. The movable stage 109 is connected to the controller 111 so as to permit communication. The movable stage 109 has an actuator (not illustrated) and moves by prescribed distance in X-axis direction or in Y-axis direction in accordance with control signal received from the controller 111.

The controller 111 has, for example, a processor, a memory, and an interface for connecting the controller 111 to each part of the microscope apparatus 100. The controller 111 controls the light source 101, the polarization conversion element 104, the movable stage 109 and the actuator 110. The controller 111 provides prescribed power to the light source 101 to cause the light source to output illuminating light. When the light source 101 has plural light emitting elements, the controller 111 transmits control signal in accordance with operation by a user via user interface (not illustrated) to the light source 101 for causing one of plural light emitting elements to output illuminating light.

The controller 111 transmits the control signal to the actuator 110 for moving the objective lens 105 by a prescribed distance along the optical axis OA. The actuator 110, upon receiving the control signal from the controller 111, moves the objective lens 105 by the instructed distance in accordance with the control signal.

The controller 111 generates an image of the object surface set on the surface or inside of the sample 120 from the light intensity signal received from the light receiving element 108. Therefore, the controller 111 transmits control signal to the movable stage 109 for moving the movable stage 109 to a prescribed position to thereby move the movable stage 109 in a plane perpendicular to the optical axis OA.

The controller 111 moves the movable stage 109 so as to position each of a plurality of measurement points set at equal interval in two dimension on the object surface at the spot of the illuminating light, and receives light intensity signal at each measurement point from the light receiving element 108. The controller 111 can obtain two dimensional image on the object surface of the sample 120 by generating an image, for example, with the light intensity signal at each measurement point as the value of a pixel.

In a variant, instead of moving the sample 120 on a movable stage such as a XY-stage for obtaining an image, the microscope apparatus may use a galvano mirror etc. to deflect the direction of the laser beam from the light source 101 and scan the sample with the beam.

Further, the controller 111 has a driving circuit (not illustrated), and by adjusting the electric voltage applied to the polarization conversion element 104 via the driving circuit, and controls the polarization conversion element 104 such that the polarization conversion element 104 can convert linear polarization having prescribed wavelength to radial polarization.

Therefore, the controller 111 controls the driving circuit such that suitable electric voltage in accordance with the wavelength of light outputted from the light source 101 is applied to each liquid crystal layer of the polarization conversion element 104.

In particular, when the light source 101 has plural light emitting elements each outputting light of different wavelength, the controller 111 adjusts the electric voltage applied to the liquid crystal layer of the polarization conversion element 104 in accordance with the light emitting element being used.

Driving voltage applied to liquid crystal layer of the polarization conversion element 104 by the driving circuit may be, for example, pulse height modulated (PHM) or pulse width modulated (PWM) alternating voltage.

Wavelength of light outputted by the light source 101 may fluctuate, for example, depending on the temperature of the light emitting element. Therefore, the controller 111 may adjust the voltage applied to liquid crystal layer of the polarization conversion element 104 based on the image on the object surface of the sample 120. For example, the controller 111 may change the voltage applied to the liquid crystal layer of the polarization conversion element 104, and by moving the movable stage 109 in two dimensions to obtain light intensity signal from the light receiving element 108, may generate plural images of the sample 120 on the object surface in accordance with the applied voltage. Then, the controller 111 correlates the voltage value and the image and stores them in built-in memory. The controller 111 determines the voltage value at which the image is the clearest, and applies that voltage via the driving circuit to the liquid crystal layer of the polarization conversion element 104.

In order to determine the clearest image, the controller 111 may, for example, generate respective frequency images by frequency transformation of the obtained images. Then, the controller 111 analyzes each frequency image to thereby specify the frequency image in which high frequency component is maximum, and determines the image corresponding to the specified frequency image as the clearest image.

The polarization conversion element 104 will be described below.

Figure 2:
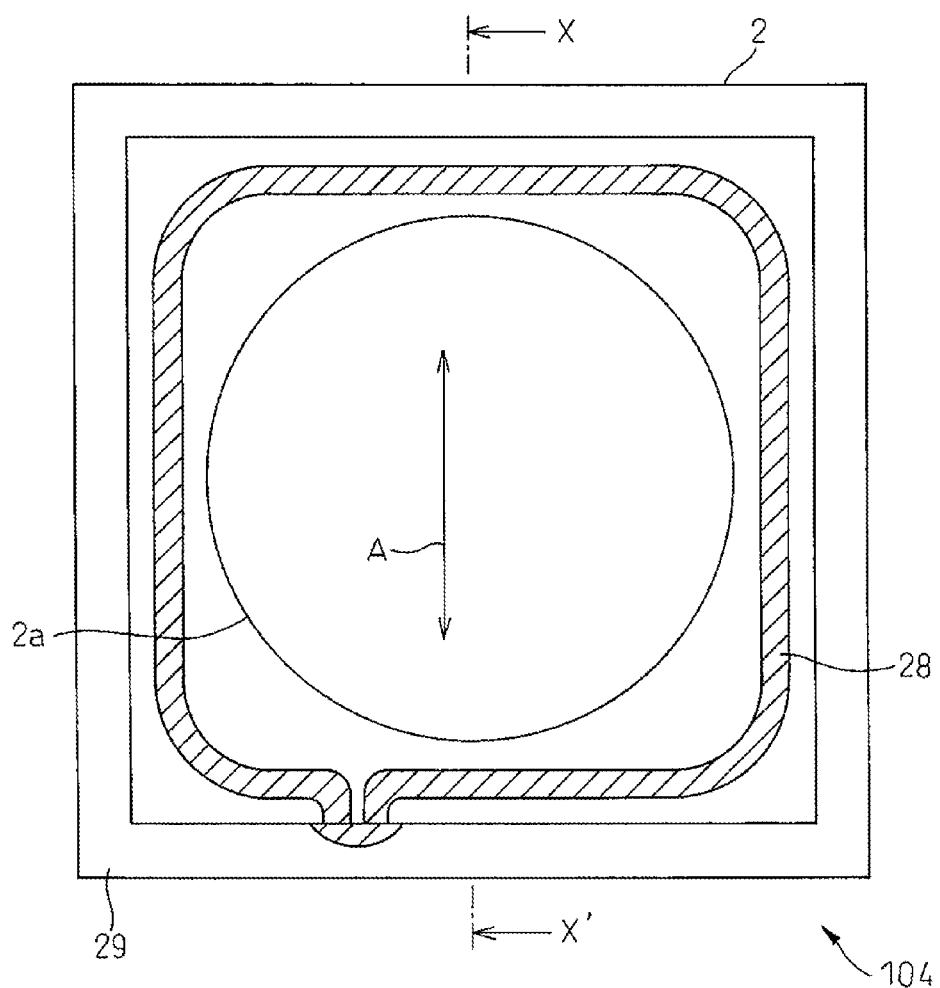
FIG. 2 is a schematic front view illustrating a polarization conversion element used in the microscope apparatus according to an embodiment of the present invention.

FIG. 2 is a schematic front view illustrating the polarization conversion element 104. FIGS. 3A and 3B are respectively schematic side sectional view of the polarization conversion element 104 taken along the line indicated by the arrows X, X' of FIG. 2. FIG. 3A illustrates the state of liquid crystal molecules contained in the polarization conversion element 104 when no electric voltage is applied to the polarization conversion element 104, and FIG. 3B illustrates the state of liquid crystal molecules contained in the polarization conversion element 104 when an electric voltage is applied to the polarization conversion element 104.

As illustrated in FIGS. 2 and 3A, the polarization conversion element 104 includes a phase reversal element 2 and a polarization plane rotation element 3 disposed adjacent to the phase reversal element 2.

The light incident on the polarization conversion element 104 is linear polarization and incident from the side of the phase reversal element 2. The linear polarization is converted, by transmitting through the phase reversal element 2 and the polarization plane rotation element 3, to radial polarization and exits from the polarization plane rotation element 3.

For convenience of explanation, the polarization plane of light incident on the polarization conversion element 104 is assumed, as illustrated by the arrow A of FIG. 2, to be orthogonal to the plane of FIG. 2 and in the longitudinal plane.

The phase reversal element 2 reverses the phase of at least one annular portion with the optical axis OA as the center relative to the phase of remaining portion. To this end, the phase reversal element 2 has a liquid crystal layer 20 and transparent substrates 21, 22 disposed substantially in parallel on both sides of the liquid crystal layer 20 along the optical axis OA. Liquid crystal molecules 27 contained in the liquid crystal layer 20 are sealed in between the transparent substrates 21, 22 and seal member 28. The phase reversal element 2 has a transparent electrode 23 disposed between the transparent substrate 21 and the liquid crystal layer 20, and a transparent electrode 24 disposed between the liquid crystal layer 20 and the transparent substrate 22. The transparent substrates 21, 22 are formed, for example, from material, for example, glass or resin, that is transparent to light having wavelength included in a prescribed wavelength range. The transparent electrodes 23, 24 are formed, for example, from material, called ITO, made of indium oxide added with tin oxide. An alignment film 25 is disposed between the transparent electrode 23 and the liquid crystal layer 20. Also, an alignment film 26 is disposed between the transparent electrode 24 and the liquid crystal layer 20. These alignment films 25, 26 align the liquid crystal molecules 27 in a prescribed direction. When the liquid crystal molecules 27 are aligned by a method not using an alignment film, for example, by photo alignment, the alignment films 25, 26 may be omitted.

On the outer periphery of substrates, transparent electrodes and alignment films, a frame 29 is disposed, and the frame 29 holds various substrates.

As illustrated in FIG. 3A, the liquid crystal molecules 27 sealed in the liquid crystal layer 20 exhibits, for example, homogeneous alignment, and are aligned in a direction substantially in parallel to the polarization plane of incident linear polarization. In other words, the liquid crystal molecules are aligned such that the direction of long axis of liquid crystal molecules 27 is substantially parallel to the arrow A illustrated in FIG. 2.

Figure 4:
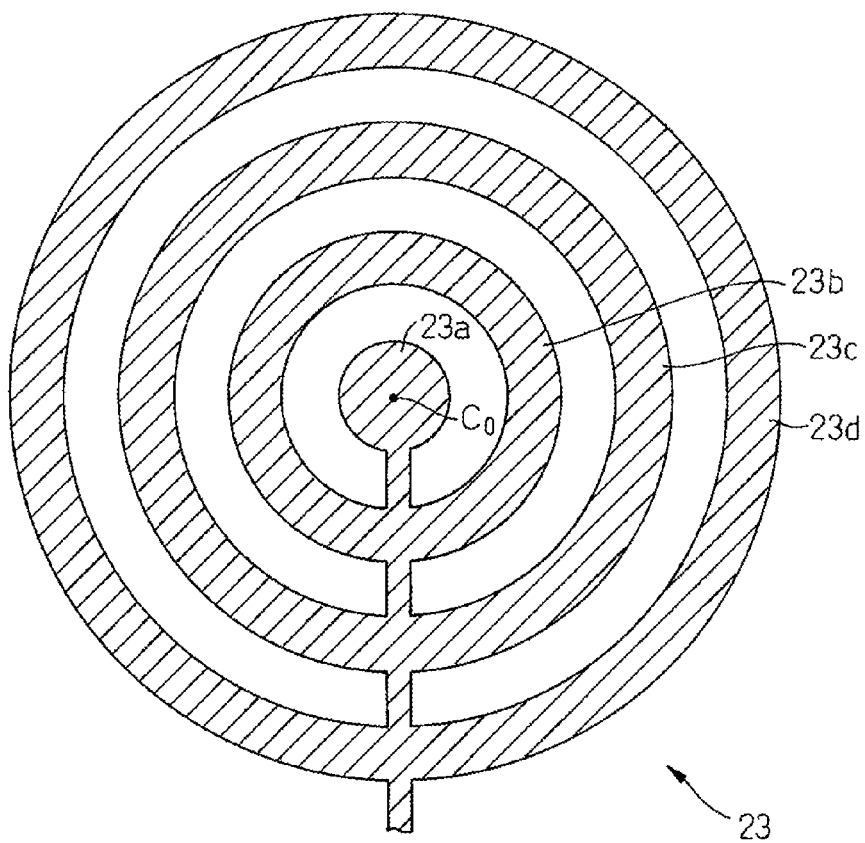
FIG. 4 is a schematic front view illustrating a transparent electrode of a phase reversal element.

FIG. 4 is a schematic front view illustrating the transparent electrode 23 provided in the phase reversal element 2 disposed on the incident side. On the other hand, the transparent electrode 24 is formed so as to cover the entire liquid crystal layer 20. The transparent electrode 24 may also have same form as the transparent electrode 23, or the transparent electrode 24 may have the electrode shape illustrated in FIG. 4 and the transparent electrode 23 may be formed so as to cover the entire liquid crystal layer 20.

The transparent electrode 23 has at least one annular shaped electrode in the shape of concentric circle with the intersection point $C_0$ of the optical axis OA and the phase reversal element 2 as the center. In the present embodiment, the transparent electrode 23 has 4 annular shaped electrodes 23a to 23d. With this construction, in the liquid crystal layer 20, there are alternately formed first annular shaped portions sandwiched between the annular shaped electrodes 23a to 23d and the transparent electrodes 24, and second annular shaped portions having only the transparent electrode 24 on one side in concentric circles. The outer circumference of the annular shaped electrode 23d corresponds to the outer circumference of the region 2a illustrated in FIG. 2.

As illustrated in FIG. 3B, when electric voltage is applied by the controller 111 between these annular shaped electrodes 23a to 23d and the transparent electrode 24 disposed in opposition with the liquid crystal layer interposed therebetween, the liquid crystal molecules are tilted such that the direction of the long axis of liquid crystal molecules contained in the first annular shaped portion 20a approaches from the direction orthogonal to the optical axis OA to the direction parallel to the optical axis OA. On the other hand, the liquid crystal molecules contained in the second annular shaped portion 20b not sandwiched between transparent electrodes remains in the direction orthogonal to the optical axis OA.

In general, the refractive index $n_e$ for the polarization component parallel to the long axis of liquid crystal molecule (i.e., for extraordinary ray) is higher than the refractive index $n_o$ for polarization component parallel to the short axis of liquid crystal molecule (i.e., for ordinary ray). When electric voltage is applied between the transparent electrodes 23 and 24, let the angle formed by the direction of long axis of liquid crystal molecule contained in the first annular shaped portion 20a with the direction of the applied electric voltage, i.e., the direction of the optical axis OA, be $\psi$, then, the light transmitting the liquid crystal layer 20 makes an angle $\psi$ with the long axis direction of liquid crystal molecule. Let the refractive index of the liquid crystal molecules for the polarization component parallel to the alignment direction of the liquid crystal molecules be $n_\psi$, then $n_e \leq n_\psi \leq n_o$. Thus, if liquid crystal molecules 27 contained in the liquid crystal layer 20 are in homogeneous alignment, and thickness of the liquid crystal layer 20 is d, there arises an optical path difference $\Delta nd$ ($=n_\psi d - n_o d$) between the polarization component passing the first annular portion 20a of the liquid crystal layer 20 sandwiched between the annular shaped electrodes 23a to 23d and the transparent electrode 24, and the polarization component passing the second annular portion 20b. Phase difference $\Delta$ between the two polarization components is $2\pi \Delta nd/\lambda$, where $\lambda$ is the wavelength of light incident on the liquid crystal layer 20.

In this way, by adjusting the electric voltage between the transparent electrode 23 and the transparent electrode 24 which the controller 111 applies, the phase reversal element 2 can modulate the phase of light passing the liquid crystal layer 20. Therefore, if a prescribed electric voltage in accordance with the wavelength of incident light is applied between the transparent electrode 23 and the transparent electrode 24, the phase reversal element 2 can shift the phase of light transmitted through the first annular portion 20a by $\pi$ relative to the phase of light transmitted through the second annular portion 20b.

The polarization plane rotation element 3 converts the linear polarization incident thereto after passing the phase reversal element 2 into radial polarization which has radial distribution of linear polarization with the intersection point $C_1$ of the optical axis OA and the polarization plane rotation element 3 as the center. To this end, the polarization plane rotation element 3 has a liquid crystal layer 30 and transparent substrates 31, 32 disposed substantially in parallel on both sides of the liquid crystal layer 30 along the optical axis OA. Any One of the transparent substrate 31 and the transparent substrate 22 of the phase reversal element 2 may be omitted. In this case, for example, the liquid crystal layer 20 is formed on one surface of the transparent substrate 22 and the liquid crystal layer 30 is formed on the other surface of the transparent substrate 22.

The polarization plane rotation element 3 has also a transparent electrode 33 disposed between the transparent substrate 31 and the liquid crystal layer 30, and a transparent electrode 34 disposed between the liquid crystal layer 30 and the transparent substrate 32. Liquid crystal molecules 37 are sealed between the transparent substrates 31, 32 and a seal member 38. The transparent substrates 31, 32 are formed of material, for example, glass or resin, that is transparent to light having wavelength included in a prescribed wavelength range. The transparent electrodes 33, 34 are formed of material such as ITO. Further, an alignment film 35 is disposed between the transparent electrode 33 and the liquid crystal layer 30. Also an alignment film 36 is disposed between the transparent electrode 34 and the liquid crystal layer 30. These alignment films 35, 36 aligns liquid crystal molecules 37 in a prescribed direction. If liquid crystal molecules 37 are aligned by some method not using an alignment film, for example, by photo alignment method, the alignment films 35, 36 may be omitted.

Further, a frame 39 is disposed on the outer periphery of each substrate, each transparent electrode and each alignment film, and this frame 39 holds each substrate. The frame 29 and the frame 39 may be integrally formed as one unit.

Liquid crystal molecules 37 sealed in the liquid crystal layer are aligned, for example, in homogeneous alignment. The liquid crystal layer 30 includes a plurality of circular sector regions arranged in a plane perpendicular to the optical axis OA with the intersection point $C_1$ as the center along the circumferential direction. The liquid crystal molecules 37 contained in each circular sector region are aligned such that the polarization plane of the incident linear polarization is rotated so as to become substantially parallel to the radial direction with the optical axis OA as the center.

Figure 5:
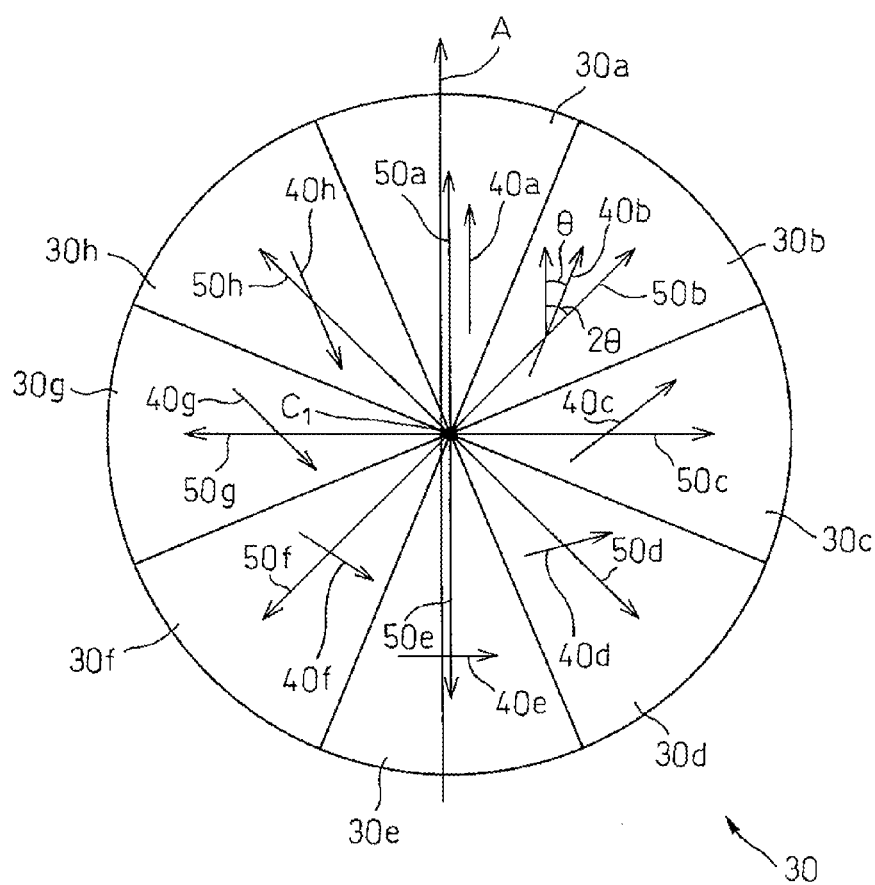
FIG. 5 is a view illustrating the alignment direction of liquid crystal in each region of the liquid crystal layer of the polarization plane rotation element, and polarization direction of linear polarization component having transmitted each region.

FIG. 5 is a schematic front view of the liquid crystal layer 30 showing alignment direction of liquid crystal in each circular sector region of the liquid crystal layer 30 and the polarization direction of the linear polarization passing each circular sector region.

In the present embodiment, the liquid crystal layer 30 has eight circular sector region 30a to 30h disposed in clockwise rotation and having different alignment directions, set so as to have equal central angle. In FIG. 5, arrows 40a to 40h respectively represent the alignment direction of the liquid crystal molecules contained in each circular sector region 30a to 30h. Arrows 50a to 50h respectively represent the polarization plane of linear polarization exiting from each circular sector region 30a to 30h. Among the arrows 50a to 50h, two arrows with the tip pointing in opposite direction means that the phases of the linear polarization represented by the arrows are shifted by π relative to each other.

A line passing through the intersection point $C_1$ and bisecting the circular sector region is referred to as the center line of the circular sector region.

Alignment direction of each circular sector region 30a to 30h is determined such that, for example, polarization plane of linear polarization component having passed the circular sector region is parallel to the center line of the circular sector region. The circular sector region 30a crossing a plane which passes the intersection point $C_1$ of the optical axis OA and the liquid crystal layer 30 and is parallel to the polarization plane A of the incident linear polarization, is denoted as the first region, and with respect to n-th circular sector region starting from the circular sector region 30a in clockwise or anticlockwise rotation, the angle θ between the alignment direction of the circular sector region and the polarization plane of the polarization component passing the circular sector region 30a is set in accordance with the following equation $$\theta = 360° \times (n-1)/(2N) \ldots (n=1,2,\ldots,N) \quad (1)$$

where N is the total number of the circular sector regions, and in the present embodiment N=8.

For example, in the circular sector region 30a for which n=1, θ=0, i.e., in the circular sector region 30a, in order to transmit incident linear polarization without rotating the polarization plane of the linear polarization, alignment direction of liquid crystal molecules are set substantially parallel to the polarization plane A of the incident linear polarization.

If n-th circular sector region is defined as n-th region starting from the circular sector region 30a as the first region and rotating in clockwise direction, alignment direction of each circular sector region 30b to 30h is set such that the angles between the alignment direction of each circular sector regions 30b to 30h and the polarization plane A of the polarization component passing the circular sector region 30a are respectively 22.5°, 45°, 67.5°, 90°, 112.5°, 135°, 157.5°, with clockwise rotation taken as positive.

Alternatively, if n-th circular sector region is defined as n-th region starting from the circular sector region 30a as the first region and rotating in anticlockwise direction, alignment direction of each circular sector region 30b to 30h is set such that the angles between the alignment direction of each circular sector regions 30b to 30h and the polarization plane A of the polarization component passing the circular sector region 30a are respectively −157.5°, −135°, −112.5°, −90°, −67.5°, −45°, −22.5°, with clockwise rotation taken as positive.

The transparent electrodes 33, 34 are disposed so as to be opposed to each other with the entire liquid crystal layer 30 sandwiched therebetween. A prescribed electric voltage is applied by the controller 111 between the transparent electrodes 33 and 34 such that the circular sector regions 30a to 30h of the liquid crystal layer 30 function as half wave plate for the wavelength included in the prescribed wavelength range.

When electric voltage is applied between the transparent electrodes 33 and 34, liquid crystal molecules are tilted in accordance with the voltage in the direction so as to become parallel to the direction of applied electric voltage. Let the angle formed by the direction of long axis of liquid crystal molecules and the direction of applied voltage be ψ, then light passing through the liquid crystal layer 30 forms the angle ψ relative to the direction of the long axis. At this time, as has been described above, if the refractive index of liquid crystal molecules for the polarization component parallel to the alignment direction of the liquid crystal molecules is $n_\psi$, then $n_o \leq n_\psi \leq n_e$, where $n_o$ is a refractive index for a polarization component orthogonal to the direction of long axis of liquid crystal molecules, and $n_e$ is a refractive index for a polarization component parallel to the direction of the long axis of liquid crystal molecules.

Thus, if liquid crystal molecules contained in the liquid crystal layer 30 are aligned homogeneously, and thickness of the liquid crystal layer 30 is d, there arise optical path difference Δnd ($=n_\psi d - n_o d$) between the polarization component parallel to the alignment direction of liquid crystal molecules and the polarization component orthogonal to the alignment direction of liquid crystal molecules. Therefore, by adjusting the electric voltage applied between the transparent electrodes 33 and 34, the optical path difference between the polarization component parallel to the alignment direction of liquid crystal molecules and the polarization component orthogonal to the alignment direction of liquid crystal molecules can be adjusted. Thus, by the controller 111 to adjust the electric voltage applied between the transparent electrodes 33 and 34, the circular sector regions 30a to 30h respectively function as half wave plate for the wavelength of the linear polarization which is output from the light source 101.

If each of the circular sector regions 30a to 30h functions as a half wave plate, when linear polarization having polarization plane at an angle θ relative to the alignment direction of liquid crystal molecules 37 passes the circular sector region, the polarization plane is rotated so as to form an angle −θ relative to the alignment direction of the transmitting circular sector region. In other words, the polarization plane is rotated by an angle 2θ with the alignment direction as center.

In the example illustrated in FIG. 5, alignment direction of liquid crystal molecules in each of the circular sector regions 30a to 30h is set such that the angle relative to the polarization plane A of the linear polarization incident to the circular sector region 30a is ½ of the angle of the center line of the circular sector region relative to the polarization plane A of the linear polarization incident to the circular sector region 30a of the liquid crystal layer 30. Therefore, with reference to the direction pointing upward from the intersection point C1 along the polarization plane A of the incident linear polarization, and taking the clockwise rotation as positive, the angle of polarization plane of the linear polarization having passed each of the circular sector regions 30a to 30h is 0°, 45°, 90°, 135°, 180°, 225°, 270°, 315°. In this manner, the light beam exiting from the polarization plane rotation element 3 has linear polarization component radially distributed with the optical axis OA as the center.

Figure 6:
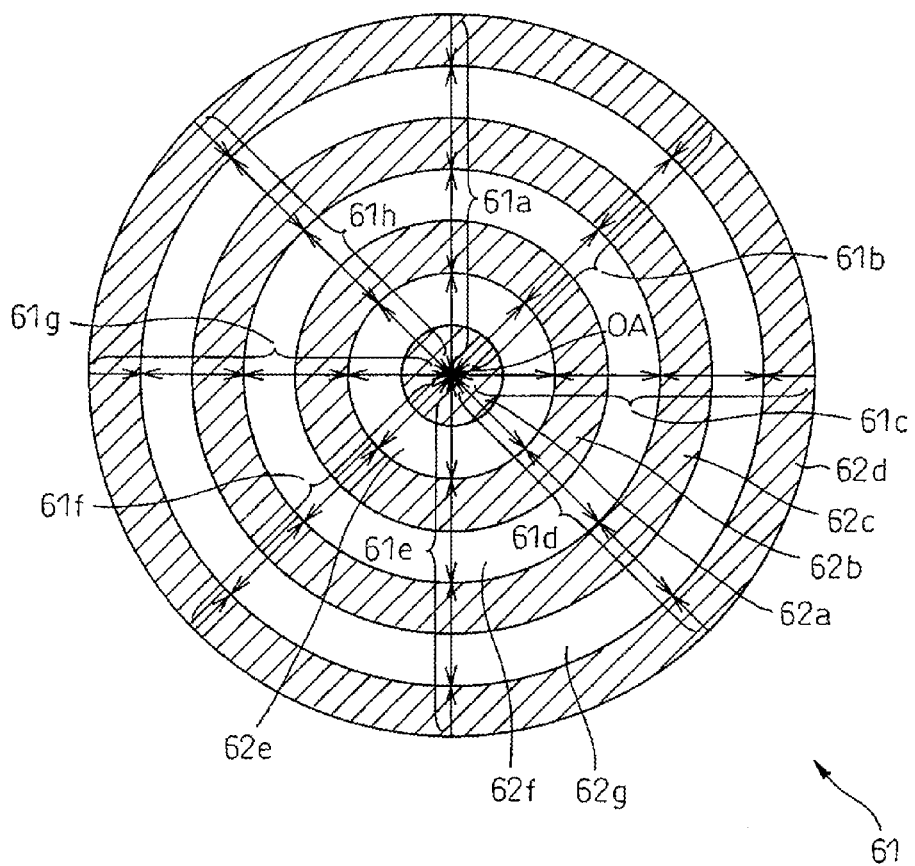
FIG. 6 is a view schematically illustrating radial polarization exiting from the polarization conversion element.

FIG. 6 is a schematic view illustrating the radial polarization 61 exiting from the polarization conversion element 104. In FIG. 6, each of arrows 61a to 61h respectively represents a linear polarization component. Among the arrows, two arrows with the tip pointing to opposite directions represent same linear polarization with the phase shifted by π relative to each other. The annular shaped regions 62a to 62d represent polarization component having passed the first annular portion of the phase reversal element 2. Also, the annular shaped regions 62e to 62g represent polarization component having passed the second annular portion of the phase reversal element 2.

As illustrated in FIG. 6, the radial polarization has 8 kinds of linear polarization 61a to 61h having polarization plane oriented in radial direction with respect to the optical axis OA. Each of the linear polarization components 61a to 61h is divided into 7 divisions along radial direction corresponding to components 62a to 62d having passed first annular portion sandwiched between the transparent electrodes 23, 24 of the phase reversal element 2, and components 62e to 62g having passed the second annular portion not sandwiched between the transparent electrodes, and their phase is shifted by $\pi$ between adjoining divisions.

The polarization plane of the polarization component having passed each of the circular sector regions 30a to 30h needs only to be distributed in radial direction with the intersection point A as the center, and the polarization plane need not necessarily be parallel to the centerline of the circular sector region transmitted. Alignment direction of the circular sector regions 30a to 30h needs only to be set such that the polarization plane of the polarization having passed the circular sector regions 30a to 30h is parallel to a prescribed line passing the intersection point $c_1$ and the circular sector region. For example, alignment direction of each of the circular sector regions 30a to 30h may be set such that the angle formed by the alignment direction of each of the circular sector regions 30a to 30h and the polarization plane A of the linear polarization incident on the circular sector region 30a is the value obtained by the equation (1) above added with a prescribed offset value. In this case, the prescribed offset value is set such that the angle formed by the centerline of each of the circular sector regions 30a to 30h and the polarization plane A plus twice the offset value (i.e., the angle formed by the polarization plane of polarization component having passed the circular sector region and the polarization plane of the linear polarization incident on the circular sector region 30a) does not exceed the angle formed by the boundary to the adjoining circular sector region and the polarization plane A, for example, to ±5°.

Number of regions of different alignment directions of the liquid crystal layer 30 of the polarization plane rotation element 3 is not limited to 8. Number of regions of different alignment directions of the liquid crystal layer 30 may be any number as long as the effect of radial polarization can be obtained. For example, the liquid crystal layer 30 may have 4, 5, 6, or 16 regions of different alignment directions.

Figure 7:
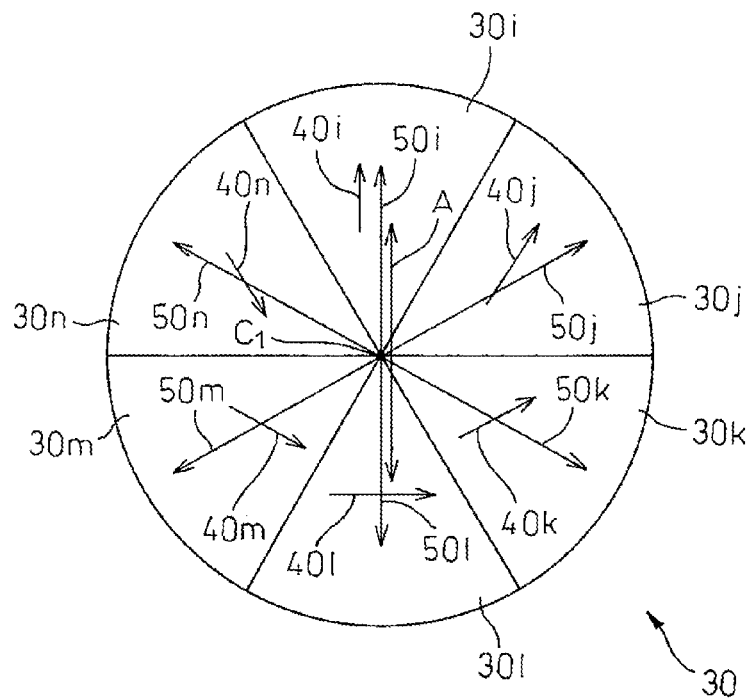
FIG. 7 is a view, for the case where the liquid crystal layer of the polarization plane rotation element has six regions of mutually different alignment directions, illustrating the alignment direction of liquid crystal in each region and polarization direction of linear polarization component having transmitted each region.

FIG. 7 is a schematic front view illustrating, in the case where the liquid crystal layer 30 includes 6 circular sector regions 30i to 30n, alignment direction of liquid crystal in each circular sector region and polarization direction of linear polarization having passed each region. In this variant of the invention, the transparent electrodes 33, 34 are disposed in opposition to each other with the liquid crystal layer 30 interposed therebetween.

In this variant, arrows 40i to 40n represent alignment direction of liquid crystal molecules contained in the circular sector regions 30i to 30n, respectively. Arrows 50i to 50n represent polarization plane of linear polarization emitting from the circular sector regions 30i to 30n, respectively. Among arrows 50i to 50n, two arrows with the tip pointing opposite direction represent two linear polarizations in the direction of the arrow with phase shifted by $\pi$ relative to each other.

Among the circular sector regions 30i to 30n, in the circular sector region 30i situated above the intersection point $c_1$ of the optical axis OA and the liquid crystal layer 30, polarization plane A of the incident linear polarization coincides with the centerline of the circular sector region 30i. Therefore, this circular sector region 30i is set to be the first region. Then, in the n-th circular sector region in clockwise rotation, the alignment direction is set such that, for example, the angle formed by the alignment direction and the polarization plane A is the angle calculated in accordance with the equation (1) above.

In this case, the angle formed by the alignment direction of the circular sector regions 30i to 30n and the polarization plane A of the polarization component passing the circular sector region 30i are, respectively, taking clockwise rotation as positive, 0°, 30°, 60°, 90°, 120°, 150°.

In this case, in order for the liquid crystal layer 30 to function as half wave plate to the linear polarization passing each of the circular sector regions 30i to 30n, an electric voltage is applied in accordance with the wavelength of incident light between the transparent electrodes 33, 34 sandwiching the circular sector regions 30i to 30n.

Thus, referring to the direction pointing from the intersection point $c_1$ upward along the polarization plane of the incident linear polarization, and taking the direction of clockwise rotation as positive, angle of the polarization plane of linear polarization component passing each of the circular sector regions 30i to 30n will be 0°, 60°, 120°, 180°, 240°, 300°. In this way, the light beam exiting from the polarization plane rotation element has linear polarization component in radial direction with the optical axis OA as the center.

As has been described above, the angle by which the long axis of the liquid crystal molecules 37 are inclined toward the optical axis OA by the electric voltage applied between the transparent electrodes 33 and 34 in order for the polarization plane rotation element 3 to convert the linear polarization to radial polarization is set equal to the angle by which the long axis of a part of the liquid crystal molecules 27 are inclined toward the optical axis OA for the phase reversal element 2 to reverse the phase of a part of incident light. Thus, the controller 111 can use suitable driving voltage respectively to drive the liquid crystal layer 20 and the liquid crystal layer 30.

Figure 8:
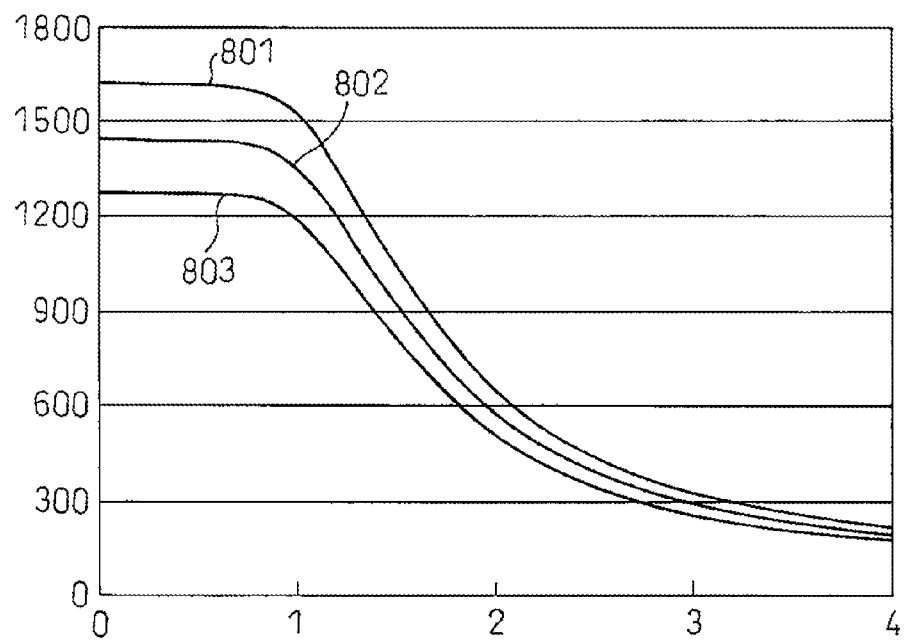
FIG. 8 is a view illustrating an example of the electric voltage applied to the liquid crystal layer between the transparent electrodes of the polarization plane rotation element and optical path difference between ordinary ray and extraordinary ray produce by the liquid crystal layer.

FIG. 8 is a view illustrating an example of the electric voltage applied to the liquid crystal layer 30 between the transparent electrodes 33 and 34, and optical path difference between ordinary ray and extraordinary ray produced by the liquid crystal layer.

In FIG. 8, horizontal axis represents voltage applied to the liquid crystal layer 30, and vertical axis represents optical path difference. Graph 801 represents the relation of applied voltage and optical path difference for light having wavelength of 450 nm. Graph 802 represents the relation of applied voltage and optical path difference for light having wavelength of 550 nm. Graph 803 represents the relation of applied voltage and optical path difference for light having wavelength of 780 nm.

For example, in order for the liquid crystal layer 30 to function as a half wave plate for light having wavelength of 450 nm, it is only necessary to apply an electric voltage that produces optical path difference of an integer multiple of 450 nm plus 225 nm between the transparent electrodes 33 and 34. Referring to graph 801, it is only necessary to apply an electric voltage of about 1.4 Vrms corresponding to optical path difference of 1125 nm between the transparent electrodes 33 and 34.

Also, for example, in order for the liquid crystal layer 30 to function as a half wave plate for light having wavelength of 550 nm, it is only necessary to apply an electric voltage that produces optical path difference of an integer multiple of 550 nm plus 275 nm between the transparent electrodes 33 and 34. Referring to graph 802, it is only necessary to apply an electric voltage of about 1 Vrms corresponding to optical path difference of 1375 nm between the transparent electrodes 33 and 34.

Further, for example, in order for the liquid crystal layer 30 to function as a half wave plate for light having wavelength of 780 nm, it is only necessary to apply an electric voltage that produces optical path difference of an integer multiple of 780 nm plus 390 nm between the transparent electrodes 33 and 34. Referring to graph 803, it is only necessary to apply an electric voltage of about 1.1 Vrms corresponding to optical path difference of 1170 nm between the transparent electrodes 33 and 34.

As has been described above, in the microscope apparatus according to an embodiment of the present invention, radial polarization is focused on a sample, so that the spot diameter near the focus can be made smaller because of z-polarization effect than the spot diameter defined by diffraction limit. Therefore, this microscope apparatus can achieve higher resolution in the direction parallel to the sample surface than the resolution defined by diffraction limit. Also, this microscope apparatus has greater depth of focus near the sample so that focusing to desired position in depth direction of a sample becomes easier.

Further, the polarization conversion element incorporated in the microscope apparatus permits the phase of a portion of linear polarization forming the radial polarization in annular shape to be reversed relative to the phase of other portion so that z-polarization effect can be efficiently produced by focusing the radial polarization.

Further, since the polarization conversion element incorporated in the microscope apparatus uses the liquid crystal layer to control polarization plane of the incident light, illuminating light of linear polarization of any wavelength included in the prescribed wavelength range outputted by the light source can be converted to radial polarization by the polarization conversion element. Therefore, irrespective of the wavelength of the illuminating light within the prescribed wavelength range, the microscope can achieve higher resolution than the resolution defined by diffraction limit.

The present invention is not limited to the above specific embodiment. For example, in the liquid crystal layer 20 of the phase reversal element 2, the liquid crystal molecules 27 contained in the second annular portion may be aligned in the direction parallel to the optical axis OA. In this case, the liquid crystal layer 20 and the liquid crystal layer 30 may be of a same thickness, and optical characteristics and electrical characteristics of liquid crystal contained in the liquid crystal layer 20 and optical characteristics and electrical characteristics of liquid crystal contained in the liquid crystal layer 30 may be made to be the same. If the liquid crystal molecules 27 are aligned in this manner, for the predetermined wavelength, voltage that the predetermined region of the liquid crystal layer 20 operates as a half-wave plate is the same as voltage that the predetermined region of the liquid crystal layer 30 operates as a half-wave plate. Therefore, the controller 111 can drive both liquid crystal layer 20 and the liquid crystal layer 30 using driving electric voltage with same waveform and amplitude.

When electric voltage applied to the liquid crystal layer 20 is same as electric voltage applied to the liquid crystal layer 30, the liquid crystal molecules 27 may be aligned such that long axis direction of the liquid crystal molecules 27 in the first annular portion and short axis direction of the liquid crystal molecules 27 in the second annular portion are parallel to the polarization plane of linear polarization incident on the phase reversal element 2.

In another variant of the embodiment, in order that no optical path difference be produced between light passing the first annular shaped portion and light passing the second annular shaped portion of the phase reversal element 2, transparent electrodes may be also formed on both sides of the liquid crystal layer 20 in the second annular shaped portion.

FIG. 9A and FIG. 9B are respectively schematic front views illustrating the transparent electrode 23 provided on the light incidence side of the phase reversal element 2 according to the variant of the embodiment. As in the previous embodiment described above, the transparent electrode 24 is formed on the entire surface of the substrate so as to cover the liquid crystal layer 20 completely. The transparent electrode 24, may have the same electrode shape as the shape of the transparent electrode 23 illustrated in FIG. 9A or FIG. 9B. Alternatively, the transparent electrode 24 may have the electrode shape as illustrated in FIG. 9A or FIG. 9B, and the transparent electrode 23 may be formed so as to cover the liquid crystal layer 20 entirely.

The transparent electrode 23 has a circular electrode 23a having the intersection point $c_0$ of the optical axis OA and the phase reversal element 2, and at least one annular shaped electrode in concentric form. In this variant, the transparent electrode 23 has five annular shaped electrodes 23b to 23f around a circular electrode 23a. A gap between adjoining electrodes is preferably small. The outer circumference of the annular shaped electrode 23f corresponds to the outer circumference of the region 2a illustrated in FIG. 2.

In the example illustrated in FIG. 9A, in order to permit each annular electrode to be controlled independently, wiring is provided to each annular electrode and is connected to the driving circuit. In the example illustrated in FIG. 9B, starting from the circular electrode 23a, even-numbered annular shaped electrodes and odd-numbered annular electrodes are respectively electrically connected with same wirings, and the wiring connected to the even-numbered annular shaped electrodes and the wiring connected to the odd-numbered annular shaped electrodes are connected respectively to the driving circuit. With this construction, each of the even-numbered annular shaped electrodes can be driven at the same electric potential. Similarly, each of the odd-numbered annular shaped electrodes can also be driven at the same electric potential. In FIG. 9B, one of the even-numbered annular shaped electrode group and the odd-numbered annular shaped electrode group needs not be controlled electrically. In this case, by applying electric voltage between the other electrode group and the transparent electrode 24, the phase of light can be reversed by the liquid crystal layer sandwiched between the other electrode group and the transparent electrode 24. Since the annular shaped electrode also has thickness, the phase of light passing the annular shaped electrode is shifted relative to the phase of light not passing the annular shaped electrode. Thus, by disposing not only the annular shaped electrodes used for voltage control but also the annular shaped electrodes not used for voltage control, the phase of light passing the phase reversal element 2 can be made approximately the same all over the element when electric voltage is not applied to the liquid crystal layer 20.

Further, it is preferable that the electric potential of the even-numbered or odd-numbered annular shaped electrode group which needs not be controlled electrically is set at the same reference electric potential as the transparent electrode 24 provided on the transparent substrate on the opposite side of the annular shaped electrode group, or at the threshold electric potential that is the maximum electric potential at which the liquid crystal molecules in the liquid crystal layer 20 do not operate. The threshold electric potential is about 1 V to 2 V in effective voltage. By setting the electric potential of the annular shaped electrode group which needs not be controlled electrically in this manner, the phase reversal element 2 can control the electric potential of the liquid crystal layer 20 at constant level, it is possible to prevent the liquid crystal of the liquid crystal layer 20 from operating erroneously due to noise such as static electricity. By setting the electric potential of the annular shaped electrode group which needs not be controlled electrically at the threshold electric potential, thermal fluctuation of the liquid crystal layer 20 can be suppressed.

Further, with respect to the polarization conversion element 104, the position of the phase reversal element 2 and the position of the polarization plane rotation element 3 may be exchanged.

FIG. 10A is a schematic rear view illustrating a polarization conversion element 104' in which the position of the phase reversal element and the position of the polarization plane rotation element are exchanged. FIG. 10B is a schematic side sectional view illustrating the polarization conversion element 104' taken along the line indicated by arrows Y, Y' illustrated in FIG. 10A. In FIG. 10A and FIG. 10B, each constituent of the polarization conversion element 104' is denoted by the same reference numeral as the corresponding constituent of the polarization conversion element according to the first embodiment illustrated in FIGS. 2 and 3.

The polarization conversion element 104' includes a polarization plane rotation element 3 and a phase reversal element 2' which is disposed adjacent to the polarization plane rotation element 3 along the optical axis OA, and reverses the phase of a part of linear polarization included in the radial polarization and distributed radially with the optical axis as the center.

Of these, the polarization plane rotation element 3 has the same construction as the construction of the polarization plane rotation element 3 according to the above-described embodiment. Light incident on the polarization conversion element 104' is linear polarization, and incident from the side of the polarization plane rotation element. This linear polarization is converted by the polarization plane rotation element 3 to radial polarization, and thereafter enters into the phase reversal element 2'. The phase reversal element 2' reverses the phase of a part of each linear polarization component included in the incident radial polarization.

As illustrated in FIG. 10A and FIG. 10B, the phase reversal element 2' has a liquid crystal layer 20 and transparent substrates 21, 22 disposed on both sides of the liquid crystal layer 20 along the optical axis OA. The liquid crystal molecules 27 are sealed between the transparent substrate 21, 22 and a sealing member 28. Also, the phase reversal element 2' has a transparent electrode 23 disposed between the transparent substrate 21 and the liquid crystal layer 20, and a transparent electrode 24 disposed between the liquid crystal layer 20 and the transparent substrate 22. Further, an alignment film 25 is disposed between the transparent electrode 23 and the liquid crystal layer 20. Also, an alignment film 26 is disposed between the transparent electrode 24 and the liquid crystal layer 20. These alignment films 25, 26 align the liquid crystal molecules 27 in a prescribed direction.

Further, a frame 29 is disposed on the outer circumference of each substrate, each transparent electrode and each alignment film, and this frame 29 serves to hold each substrate.

FIG. 10A illustrates the alignment direction of liquid crystal molecules sealed in the liquid crystal layer 20. The liquid crystal molecules sealed in the liquid crystal layer 20 is aligned, for example, in homogeneous alignment. The liquid crystal layer 20 has a plurality of circular sector regions $20a$ to $20h$ arranged in circumferential direction with the intersection point $C_O$ of the optical axis and the liquid crystal layer 20 as the center.

Arrows $21a$ to $21h$ show alignment directions of liquid crystal molecules contained in each circular sector region. As indicated by the arrows $21a$ to $21h$, the liquid crystal molecules sealed in each circular sector region $20a$ to $20h$ are aligned such that its long axis points in radial direction with the intersection point $c_0$ as the center. Therefore, the polarization plane of light that exits from the polarization plane rotation element 3 is not rotated after passing each of the circular sector regions $20a$ to $20h$.

Each of the circular sector regions $20a$ to $20h$ is preferably set so as to have same position when projected in the direction of the optical axis OA as the circular sector regions $30a$ to $30h$ of the liquid crystal layer 30 of the polarization plane rotation element 3 as illustrated in FIG. 5. In this case, the linear polarization which has passed the circular sector region $30a$ and has radial polarization component with respect to the intersection point $c_1$ is transmitted by the circular sector region $20a$. Similarly, linear polarizations which have passed the circular sector region $30b$ to $30h$ respectively are transmitted by the circular sector regions $20b$ to $20h$.

The transparent electrode 23 has at least one annular shaped electrode disposed concentrically with the intersection point $c_0$ as the center. For example, the transparent electrode 23 has the same construction as the transparent electrode illustrated in FIG. 4, FIG. 9A or FIG. 9B. On the other hand, the transparent electrode 24 is disposed so as to cover the entire liquid crystal layer 20. A prescribed electric voltage is applied between the transparent electrodes 23 and 24 such that the phase of light passing through the first annular portion $20a$ sandwiched between transparent electrodes is shifted by $\pi$ relative to the phase of light passing through the second annular portion $20b$ not sandwiched between transparent electrodes.

With such construction, in radial polarization having passed the phase reversal element 2', the phase of the linear polarization component included in the radial polarization having passed the first annular portion is reversed relative to the phase of light having passed the second annular portion. Therefore, this polarization conversion element also can convert the incident linear polarization to radial polarization having the distribution of polarization plane and the distribution of phase as illustrated in FIG. 6.

In the polarization conversion element 104', since the liquid crystal molecules of the phase reversal element 2' are aligned in radial direction with the intersection point of the optical axis and the phase reversal element 2' as the center, it is not necessary to match the polarization plane of the linear polarization incident on the polarization conversion element with the alignment direction of the liquid crystal molecules of the phase reversal element 2'. Even if the polarization plane of the incident linear polarization deviates from the centerline of the reference circular sector region (for example, the region $30a$ in FIG. 5) of the polarization plane rotation element 3, the polarization plane rotation element 3 can convert the incident linear polarization to radial polarization. Therefore, this polarization conversion element can simplify aligning adjustment when incorporated in an optical system.

If a same voltage is applied to the liquid crystal layer 30 as the voltage applied to the liquid crystal layer 20, the liquid crystal molecules 27 may be aligned such that, in the first annular portion, long axis of the liquid crystal molecules 27 points in a radial direction with the intersection point $c_0$ as the center, and in the second annular portion, long axis of the liquid crystal molecules 27 points in a circumferential direction with the intersection point $c_0$ as the center.

In the microscope apparatus according to the above-described embodiment, in order to increase resolution in depth direction of the sample 120, i.e., along the optical axis OA, the controller 111 may select the driving voltage applied to each of the liquid crystal layers 20 and 30 of the polarization conversion element 104 or 104' such that the polarization conversion element 104 or 104' does not convert the incident linear polarization to radial polarization. For example, when the resolution in depth direction of the sample 120 is to be increased, the controller 111 adjusts the driving voltage applied to the liquid crystal layer 20 such that, in each region of the liquid crystal layer, the difference of optical path for an ordinary ray and an extraordinary ray is an integer multiple of the wavelength of light outputted from the light source 101. Also, the controller 111 adjusts the driving voltage applied to the liquid crystal layer 30 such that the difference of optical path between the light passing the first annular portion and the light passing the second annular portion of the liquid crystal layer is an integer multiple of the wavelength of light outputted from the light source 101. In this case, resolution in the direction parallel to the surface of the sample 120, i.e., in the direction orthogonal to the optical axis OA, is the resolution defined by diffraction limit.

On the other hand, when the resolution in the direction parallel to the surface of the sample 120, i.e., in the direction orthogonal to the optical axis OA, is increased higher than the resolution defined by diffraction limit, as described above, the controller 111 applies the driving voltage to each of the liquid crystal layers 20 and 30 such that the polarization conversion element 104 or 104' can convert the incident linear polarization to radial polarization. In this case, however, as compared to the case where linear polarization is focused on the object surface of the sample 120, the range of small spot diameter of the light focused on the object surface of the sample 120 becomes longer in depth direction. Therefore, resolution in depth direction when radial polarization is focused on the object surface of the sample 120 is lower than the resolution in a depth direction when linear polarization is focused on the object surface of the sample 120.

Thus, the microscope apparatus according to the above-described embodiment can, by adjusting the driving voltage applied to each of the liquid crystal layer of the polarization conversion element, either improve the resolution in the direction parallel to the surface of the sample by focusing radial polarization on the sample, or improve the resolution in depth direction by focusing non-radial polarization on the sample.

Further, this microscope apparatus needs only to change the driving voltage in order to switch the light focused on the sample as described above, so that, unlike the case where a polarization conversion element made using an element such as photonic crystal which does not permit an amount of rotation of polarization plane to be adjusted, a part or all of the microscope apparatus needs not be moved mechanically. Therefore, with this microscope apparatus, shift of focusing position at the time of switching the light can be prevented.

The optical system of the microscope apparatus needs not be a confocal optical system. In this case, the mask plate is omitted in the microscope apparatus according to the above-described embodiment, and the light receiving element is disposed at the focal plane of the condenser lens.

Alternatively, according to another embodiment, the microscope apparatus may include an observation optical system separately from the illuminating optical system. In this case, for example, the illuminating optical system is disposed on the side of one surface of the sample, and includes a light source, a collimating lens, a polarization conversion element, and an objective lens. As in the above-described embodiment, illuminating light that is linear polarization outputted from the light source, and after being collimated to parallel beam by the collimating lens, passes the polarization conversion element to be converted to radial polarization. The illuminating light converted to radial polarization is focused by the objective lens onto the object surface set on the surface or inside of the sample disposed near the focal point of the objective lens. In this case, the polarization conversion element is disposed in the entrance pupil plane of the objective lens. With this construction, since the illuminating optical system can produce z-polarization effect near the focal plane of the objective lens, the illuminating light is focused on the object surface so as to have smaller spot diameter than the spot diameter defined by diffraction limit.

On the other hand, an observation optical system is disposed on the side of the other surface, and includes an objective lens and a condenser lens. The observation optical system focuses the image of the sample illuminated by the illuminating optical system onto the light receiving element.

Further, the objective lens incorporated in the microscope apparatus may be replaceable. In this case, pupil diameter may be different depending on the objective lens. In order to obtain same super resolution effect by using objective lens of different pupil diameter, the phase reversal element of the polarization conversion element preferably forms a prescribed number of concentric annular portions with the optical axis as the center in the light flux passing the phase reversal element irrespective of the pupil diameter of the objective lens, and the phase of the light passing adjoining annular portions is reversed to each other. The prescribed number is an integer not less than 2, for example, an integer not less than 3 and not more than 8.

The polarization plane rotation element according to the above-described embodiment is applicable to various objective lenses of different pupil diameter.

FIG. 11A is a schematic front view showing the structure of the transparent electrode 23' on the light incidence side of the phase reversal element according to a variant for resolving this problem, and FIG. 11B is a schematic rear view showing the structure of the transparent electrode 24' on the light exit side of the phase reversal element according to the variant. In FIG. 11A and FIG. 11B, in order to help understand difference of size of the transparent electrode 23' and size of the transparent electrode 24', an inner boundary 281 of the sealing member in the liquid crystal layer of the phase reversal element is also illustrated. Except for the transparent electrodes, the structure of the phase reversal element may be the same as the structure of the phase reversal element according to any of the above-described embodiments. Therefore, only the transparent electrode will be described here.

In this variant, the transparent electrode 23' has 7 concentric annular shaped electrodes 231a to 231g with the intersection point $c_0$ of the optical axis OA and the phase reversal element as the center. With these annular electrodes, approximately the entire circular region of radius $r_1$ (i.e., distance from the intersection point $c_0$ to the outer periphery of the outer most annular electrode 231g of the transparent electrode 23') with the intersection point $c_0$ as the center is covered. This radius $r_1$ is set, for example, substantially equal to the radius of the light flux passing the phase reversal element when an objective lens of relatively large pupil diameter is used.

Similarly, the transparent electrode 24' has 7 concentric annular shaped electrodes 241a to 241g with the intersection point $c_0$ as the center. With these annular electrodes, approximately the entire circular region of radius $r_2$ (i.e., distance from the intersection point $c_0$ to the outer periphery of the outer most annular electrode 241g of the transparent electrode 24') with the intersection point $c_0$ as the center is covered. This radius $r_2$ is set, for example, substantially equal to the radius of the light flux passing the phase reversal element when an objective lens of relatively small pupil diameter is used. Thus, the radius $r_2$ is set smaller than the radius $r_1$.

For either of the transparent electrodes 23' and 24', two adjoining annular electrodes are disposed spaced apart with a gap narrower than the width of the annular electrode, and are insulated from each other.

When an objective lens with relatively large pupil diameter is used, all of the annular electrodes of the transparent electrode 24' are energized at equal potential, whereas annular electrodes of the transparent electrode 23' are alternately energized. For example, annular electrodes 231a, 231c, 231e and 231g are energized while annular electrodes 231b, 231d and 231f are not energized. By appropriately adjusting the voltage between the energized annular electrodes of the transparent electrode 23' and the transparent electrode 24', the phase of light passing the liquid crystal layer sandwiched between these electrodes is shifted by $\pi$ relative to the phase of light passing the liquid crystal layer sandwiched between non-energized annular electrodes of the transparent electrode 23' and the transparent electrode 24'.

When an objective lens with a relatively small pupil diameter is used, all of the annular electrodes of the transparent electrode 23' are energized at equal potential, whereas annular electrodes of the transparent electrode 24' are alternately energized. For example, annular electrodes 241a, 241c, 241e and 241g are energized while annular electrodes 241b, 241d and 241f are not energized. By appropriately adjusting the voltage between the energized annular electrodes of the transparent electrode 24' and the transparent electrode 23', the phase of light passing the liquid crystal layer sandwiched between these electrodes is shifted by $\pi$ relative to the phase of light passing the liquid crystal layer sandwiched between non-energized annular electrodes of the transparent electrode 24' and the transparent electrode 23'.

The number of annular electrodes of the transparent electrode 23' and number of annular electrodes of the transparent electrode 24' are equal, and the two transparent electrodes are different in radius. Therefore, the phase reversal element according to this variant can generate, when either of two objective lenses with different pupil diameter is used, equal number of concentric annular shaped portions with the optical axis as the center in the light flux in which phase is reversed in adjoining portions.

The number of annular electrode of two transparent electrodes may be different. For example, in order that radius of the transparent electrode 23' is equal to radius of the transparent electrode 24', the transparent electrode 24' may have one or more annular electrode outside of the annular electrode 241g.

According to still another variant of the phase reversal element, the transparent electrode provided on one side of the liquid crystal layer of the phase reversal element is disposed so as to cover entire liquid crystal layer in the same manner as the transparent electrode 24 illustrated in FIG. 3A, and the transparent electrode provided on the other side of the liquid crystal layer may have a plurality of concentric annular electrodes provided so as to cover approximately the entire liquid crystal layer in the same manner as the transparent electrode 23' illustrated in FIG. 11A. In this variant, however, a width of each annular electrode is narrower than a width of the annular electrode of the transparent electrode 23', and is preferably set to about 1/10 to about 1/2 of the width of the annular electrode of transparent electrode 23'. In this case, grouping adjoining plurality of annular electrodes as one set, along the radial direction with the intersection point with the optical axis as the center, alternately energized set of annular electrodes and non-energized set of annular electrodes are disposed. With this construction, annular shaped portions are formed such that phase is reversed between adjoining portions. By suitably selecting energized set of annular electrodes in accordance with pupil diameter of an objective lens, a prescribed number of annular shaped portions are formed irrespective of the pupil diameter.

The above-mentioned polarization conversion element can be incorporated in various light irradiation apparatus other than microscope apparatus and used. For example, the polarization conversion element can be incorporated in optical pickup apparatus as an example of light irradiation apparatus.

Figure 12:
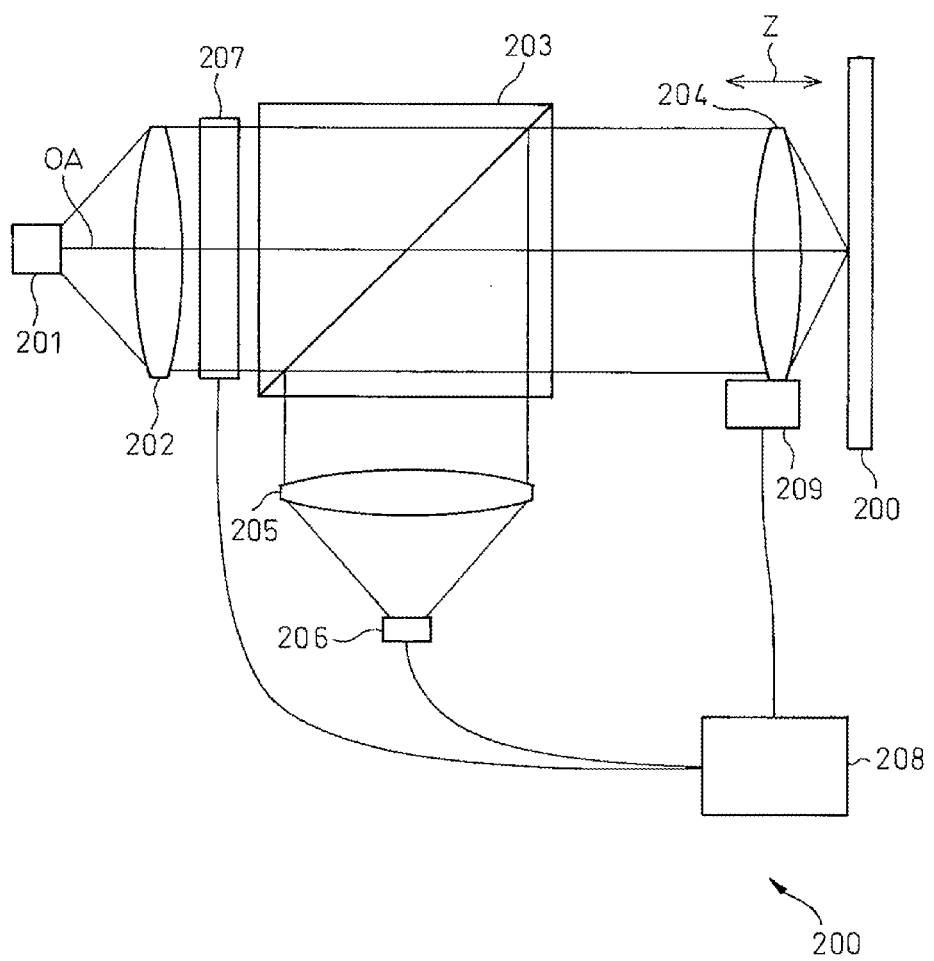
FIG. 12 is a schematic view illustrating the construction of a optical pickup apparatus as an example of a light irradiation apparatus using the polarization conversion element according to another embodiment.

FIG. 12 is a schematic view illustrating the construction of a optical pickup apparatus including a polarization conversion element. As illustrated in FIG. 12, the optical pickup apparatus 200 includes a light source 201, a collimating lens 202, a beam splitter 203, an objective lens 204, an imaging lens 205, a photo detector 206, a polarization conversion element 207, a controller 208, and an actuator 209.

The light source 201, the collimating lens 202, the polarization conversion element 207, a beam splitter 203 and the objective lens 204 are arranged in a row along the optical axis. The collimating lens 202, the polarization conversion element 207, beam splitter 203 and the objective lens 204 focuses the light emitted from the light source 201 onto a recording medium 210. On the other hand, the imaging lens 205 and the photo detector 206 are disposed on the side of the beam splitter 203 in the direction orthogonal to the optical axis OA. Light reflected or scattered from the recording medium 210, after passing the objective lens 204, is reflected from the beam splitter 203, is focused by the imaging lens 205 to the photo detector 206. Although not illustrated, the optical pickup apparatus 200 may include various compensating optical systems such as a spherical aberration compensating optical system.

The light source includes, for example, a semiconductor laser, and outputs linear polarization.

The collimating lens 202 is disposed such that the light source 201 is positioned at the front focus so that linear polarization outputted from the light source is converted to parallel beam.

The polarization conversion element 207 is a polarization conversion element according to any one of the embodiment described above or the variant of the embodiment, and is preferably disposed in front side pupil plane. In the present embodiment, the polarization conversion element 207 is disposed between the collimating lens 202 and the beam splitter 203. The polarization conversion element 207 converts the linear polarization incident on the polarization conversion element 207 after passing the collimating lens 202 to radial polarization. The polarization conversion element 207 is preferably disposed such that, for example, among various regions of the liquid crystal layer of the polarization conversion element that converts linear polarization to radial polarization, the alignment direction of liquid crystal molecules contained in the region not rotating the polarization plane of the linear polarization (for example, the circular sector region 30a as illustrated in FIG. 5) is substantially coincident with the polarization plane of the linear polarization incident on the polarization conversion element 207, and the angle between the alignment direction of liquid crystal molecules in other region and the polarization plane of the incident linear polarization is 1/2 of the angle by which the polarization plane is rotated.

The objective lens 204 focuses the radial polarization exiting the polarization conversion element 207 onto the recording medium 210. In this case, light collimated by the objective lens 204 is z-polarization near the focus. Therefore, the spot diameter of light beam near the focus can be made smaller than the spot diameter defined by diffraction limit. For example, the spot diameter of light beam according to this embodiment is about 1/1.5 to 1/1.7 of the spot diameter defined by diffraction limit. The optical pickup apparatus 200 can have larger depth of focus of light beam.

To the objective lens 204, an actuator 209 for tracking is further provided. The actuator 209 moves the objective lens 204 in the direction of the arrow Z in the drawing so that the light beam collimated by the objective lens 204 can accurately follow the track of the recording medium 210. The actuator 209 is connected to the controller 208, and moves the objective lens 204 in accordance with the control signal from the controller 208.

Light reflected or scattered from the recording medium 210 is amplitude-modulated by the information (bit) recorded on the track surface of the recording medium 210. This light is again transmitted by the objective lens 204 to form parallel light beam. The light beam is reflected by the beam splitter 203 and enters the imaging lens 205. The imaging lens 205 focuses the incident light onto the photo detector 206.

The photo detector 206 has, for example, a plurality of semiconductor photo detectors such as CCD or C-MOS arranged in an array. Each semiconductor photo detector outputs an electrical signal corresponding to the intensity of detected light. The photo detector 206 averages the electrical signal outputted by each of the semiconductor photo detector, and transmits the electrical signal corresponding to the average value to the controller 208 as the light intensity signal representing the intensity of detected light.

The controller 208 reads out recording information from the light intensity signal received from the photo detector 206. The controller 208 also controls the polarization conversion element 207 and the actuator 209. To this end, the controller 208 is connected to the driving circuit of the polarization conversion element 207. Also, the controller 208 is connected to the photo detector 206, and receives the light intensity signal from the photo detector 206. The controller 208 adjusts the voltage applied to each liquid crystal layer of the polarization conversion element 207, such that the polarization conversion element 207 can convert the linear polarization outputted from the light source 201 to radial polarization. Specifically, the controller 208 changes the voltage adjusting signal outputted to the driving circuit 5 of the polarization conversion element 207 to thereby adjust the electric voltage applied to each liquid crystal layer of the polarization conversion element 207, and obtains the light intensity signal, correlates the value of electric voltage with the value of light intensity signal, and stores it in the built-in memory. Further, the controller 208 determines the value of electric voltage that maximizes the light intensity signal based on the value of light intensity signal and electric voltage stored in the memory, and transmits the voltage adjusting signal corresponding to the electric voltage to the driving circuit of the polarization conversion element 207. The driving circuit of the polarization conversion element 207 applies the driving electric voltage corresponding to the received voltage adjusting signal to each liquid crystal layer.

As has been described above, a optical pickup apparatus using the polarization conversion element focuses radial polarization onto a recording medium, and because of z-polarization effect, can obtain spot size near the focus smaller than the spot size defined by diffraction limit. Thus, this optical pickup apparatus has a higher resolution than the resolution defined by diffraction limit. Therefore, this optical pickup apparatus can read out the information recorded on a recording medium in a recording density higher than the recording density limited by the resolution defined by diffraction limit. Since this optical pickup apparatus can achieve larger depth of focus near the recording medium, occurrence of reading error due to fluctuation of distance between the recording medium and the optical pickup apparatus can be suppressed.

The pickup apparatus may have a plurality of light sources outputting light of different wavelengths. For example, the optical pickup apparatus 200 may further have a second light source (not illustrated) separately from the light source 201, and a second beam splitter (not illustrated) for directing light outputted from each light source to the polarization conversion element 207. In this case, the second beam splitter is arranged, for example, between the collimating lens 202 and the beam splitter 203, and the second light source is arranged laterally on the side of the second beam splitter, so that, not only the light from the light source 201 is collimated onto the recording medium 210, but also the light outputted from the second light source is, after being reflected from the second beam splitter, collimated via the beam splitter 203, the polarization conversion element 207, and the objective lens 204 onto the recording medium 210.

The controller 208 causes the light source or the second light source to output light, and as has been described in FIG. 8, transmits the voltage adjusting signal corresponding to the light source outputting light to the driving circuit of the polarization conversion element 207 to thereby enable the polarization conversion element 207 to convert the light from the light source to radial polarization. Thus, the optical pickup apparatus can collimate the light outputted from any of the plurality of light sources onto the recording medium 210 in a spot size smaller than the spot size defined by diffraction limit.

The polarization conversion element 207 may be disposed between the beam splitter 203 and the objective lens 204 so as to transmit the light reflected or scattered from the recording medium 210.

The light irradiation apparatus using the polarization conversion element may be a light processing apparatus such as a laser knife, laser processing machine, etc., that uses light to process an object. In this case, the polarization conversion element is disposed, as in the optical pickup apparatus described above, between the light source that outputs desired linear polarization and the objective lens that focuses light, in particular, in the pupil plane on the light source side of the objective lens. With such construction, near the focal point of the objective lens, the focused light beam becomes z-polarization. Therefore, the light processing apparatus using the polarization conversion element can achieve minimum machinable size smaller than that defined by diffraction limit.

Further, the light irradiation apparatus may be an apparatus such as an interferometer which uses light to measure the shape of an object. In this case, the polarization conversion element is disposed between the light source that outputs desired linear polarization and the objective lens that focuses light, in particular, in the pupil plane on the light source side of the objective lens.

As has been described above, those skilled in the art can make various modifications to the embodiments without departing the scope of the present invention.

LIST OF REFERENCE NUMERALS 100 microscope apparatus
101 light source
102 collimating lens
103 beam splitter
104, 104' polarization conversion element
105 objective lens 106 condenser lens
107 masking plate
108 light receiving element
109 movable stage
110 actuator
111 controller
2, 2' phase reversal element
3 polarization plane rotation element
20, 30 liquid crystal layer
20a to 20h, 30a to 30n circular sector region
21, 22, 31, 32 transparent substrate
23, 24, 33, 34, 23', 24' transparent electrode
25, 26, 35, 36 alignment film
27, 37 liquid crystal molecule
28, 38 sealing member
29, 39 mirror frame
200 optical pickup apparatus
201 light source
202 collimating lens
203 beam splitter
204 objective lens
205 imaging lens
206 light receiving element
207 polarization conversion element
208 controller
209 actuator
210 recording medium

The invention claimed is:

1. A microscope apparatus comprising:
a first light source which outputs linear polarization having a first wavelength;
a polarization conversion element which comprises a liquid crystal layer containing liquid crystal molecules, and which converts the linear polarization to radial polarization by transmitting the linear polarization through the liquid crystal layer;
an objective lens which focuses the radial polarization onto an object surface;
a condenser lens which collimates light from the object surface;
a light receiving element which receives the light collimated by the condenser lens; and
a controller which applies an electric voltage depending on the first wavelength to the liquid crystal layer of the polarization conversion element;
wherein the polarization conversion element is disposed on the light source side of the objective lens, and comprises a phase reversal element which reverses the phase of a part of incident light and a polarization plane rotation element which converts the linear polarization to radial polarization, arranged along the optical axis;
wherein the polarization plane rotation element comprises the liquid crystal layer and two first transparent electrodes disposed in opposition to each other so as to sandwich the liquid crystal layer;
wherein the liquid crystal layer has a plurality of regions disposed along circumferential direction with a first intersection point of the polarization plane rotation element and the optical axis as the center, alignment direction of the liquid crystal molecules contained in each of the plurality of regions being different from each other;
wherein each of the plurality of regions of the liquid crystal layer rotates, by an electric voltage depending on the first wavelength being applied between the two first transparent electrodes, the polarization plane of the component of the linear polarization passing the region in accordance with the alignment direction of the liquid crystal molecules contained in the region so as to become parallel to the radial direction with the first intersection point as the center; and
wherein the phase reversal element has first annular portions and second annular portions alternately disposed along the radial direction with a second intersection point of the phase reversal element and the optical axis as the center, and reverses the phase of the linear polarization or the radial polarization incident on the first annular portions relative to the phase of the linear polarization or the radial polarization incident on the second annular portions.

2. The microscope apparatus according to claim 1,
wherein the alignment direction of the liquid crystal molecules contained in each of the plurality of regions is such that the angle between the alignment direction and the polarization plane of the linear polarization incident on the polarization plane rotation element is ½ of the angle made by a prescribed line passing the first intersection point and the relevant region with the polarization plane; and
wherein, by an electric voltage in accordance with the first wavelength being applied between the two transparent electrodes, the polarization plane rotation element rotates the polarization plane of a component of the linear polarization passing each of the plurality of regions by twice the angle between the polarization plane of the linear polarization and the alignment direction so as to bring the polarization plane of the component parallel to the prescribed line.

3. The microscope apparatus according to claim 2, wherein the prescribed line in each of the plurality of regions is a line passing the first intersection point and bisecting the relevant region.

4. The microscope apparatus according to claim 1, wherein, when, among the plurality of regions, one of two regions intersecting a plane which passes the optical axis and is parallel to the polarization plane of the linear polarization, is taken as the first region, and total number of the plurality of regions is taken as N, the alignment direction in each of the plurality of regions is set such that the angle θ formed by the alignment direction in n-th region in clockwise or anticlockwise rotation starting from the first region with the polarization plane of the linear polarization incident on the first region is determined by the equation $$\theta = 360° \times (n-1)/(2N)$$

where n is an integer from 1 to N.

5. The microscope apparatus according to claim 1, wherein the phase reversal element comprises:
a second liquid crystal layer containing liquid crystal molecules; and
two second transparent electrodes disposed in opposition to each other so as to sandwich the second liquid crystal layer; and
wherein one of the two second transparent electrodes is a plurality of annular electrodes corresponding to the first annular portion, and by applying an electric voltage in accordance with the first wavelength between the annular electrodes and the other of the two second transparent electrodes, phase of the linear polarization or the radial polarization incident on the first annular portion is reversed.

6. The microscope apparatus according to claim 5,
wherein the phase reversal element is disposed on the light incidence side of the polarization plane rotation element; and
wherein the liquid crystal molecules contained in the second liquid crystal layer are aligned along the direction parallel to the polarization plane of the linear polarization incident on the phase reversal element.

7. The microscope apparatus according to claim 5,
wherein the phase reversal element is disposed on the light exit side of the polarization plane rotation element; and
wherein the liquid crystal molecules contained in the second liquid crystal layer are aligned in radial direction with the second intersection point as the center.

8. The microscope apparatus according to claim 5, further comprising a second light source which outputs linear polarization having a second wavelength different from the first wavelength, and is disposed such that the linear polarization having the second wavelength passes the polarization conversion element and the objective lens, and is focused onto the object surface;
wherein the controller turns either the first light source or the second light source on, and applies an electric voltage in accordance with the light source being turned on to the two first transparent electrodes and between the two second transparent electrodes.

9. An optical pickup apparatus comprising:
a light source which outputs linear polarization having a prescribed wavelength;
a polarization conversion element which comprises liquid crystal layer containing liquid crystal molecules, and converts the linear polarization transmitted through the liquid crystal layer to radial polarization;
an objective lens which focuses the radial polarization onto object surface;
an imaging lens which forms an image from light reflected from the object surface;
a light receiving element which receives light imaged by the imaging lens, and outputs signal depending on the light intensity;
a driving circuit which applies an electric voltage depending on the prescribed wavelength to the liquid crystal layer of the polarization conversion element; and
a controller which adjusts the electric voltage outputted by the driving circuit so as to maximize the signal;
wherein the polarization conversion element is disposed in the pupil plane of the objective lens on the light source side, and comprises a phase reversal element which reverses the phase of a part of incident light and a polarization plane rotation element which converts the linear polarization to radial polarization, arranged along the optical axis;
wherein the polarization plane rotation element has the liquid crystal layer and two first transparent electrodes disposed in opposition to each other so as to sandwich the liquid crystal layer;
wherein the liquid crystal layer has a plurality of regions disposed along circumferential direction with a first intersection point of the polarization plane rotation element and the optical axis as the center, alignment direction of the liquid crystal molecules contained in each of the plurality of regions being different from each other;
wherein each of the plurality of regions of the liquid crystal layer rotates, by an electric voltage depending on the prescribed wavelength being applied between the two first transparent electrodes, the polarization plane of the component of the linear polarization transmitted through the region in accordance with the alignment direction of the liquid crystal molecules contained in the region so as to become parallel to the radial direction with the first intersection point as the center; and
wherein the phase reversal element has first annular portions and second annular portions alternately disposed along the radial direction with a second intersection point of the phase reversal element and the optical axis as the center, and reverses the phase of the linear polarization or the radial polarization incident on the first annular portions relative to the phase of the linear polarization or the radial polarization incident on the second annular portions.

10. A light irradiation apparatus comprising:
a light source which outputs linear polarization having a prescribed wavelength;
a polarization conversion element which comprises liquid crystal layer containing liquid crystal molecules, and converts the linear polarization passing the liquid crystal layer to radial polarization;
an objective lens which focuses the radial polarization onto object surface; and
a driving circuit which applies an electric voltage in accordance with the prescribed wavelength to the liquid crystal layer;
wherein the polarization conversion element is disposed in the pupil plane of the objective lens on the side of the light source, and comprises a phase reversal element which reverses the phase of a part of incident light and a polarization plane rotation element which converts the linear polarization to radial polarization, arranged along the optical axis;
wherein the polarization plane rotation element comprises the liquid crystal layer and two first transparent electrodes disposed in opposition to each other so as to sandwich the liquid crystal layer;
wherein the liquid crystal layer has a plurality of regions disposed along circumferential direction with a first intersection point of the polarization plane rotation element and the optical axis as the center, alignment direction of the liquid crystal molecules contained in each of the plurality of regions being different from each other;
wherein each of the plurality of regions of the liquid crystal layer rotates, by an electric voltage depending on the prescribed wavelength being applied between the two first transparent electrodes, the polarization plane of the component of the linear polarization passing the region in accordance with the alignment direction of the liquid crystal molecules contained in the region so as to become parallel to the radial direction with the first intersection point as the center; and
wherein the phase reversal element has first annular portions and second annular portions alternately disposed along the radial direction with a second intersection point of the phase reversal element and the optical axis as the center, and reverses the phase of the linear polarization or the radial polarization incident on the first annular portions relative to the phase of the linear polarization or the radial polarization incident on the second annular portions.

* * * * *